(12) United States Patent
Gould et al.

(10) Patent No.: US 6,393,158 B1
(45) Date of Patent: May 21, 2002

(54) METHOD AND STORAGE DEVICE FOR EXPANDING AND CONTRACTING CONTINUOUS PLAY MEDIA SEAMLESSLY

(75) Inventors: Eric Justin Gould, Austin, TX (US); Rachel M. Strickland, San Francisco, CA (US)

(73) Assignee: Monkeymedia, Inc., Austin, TX (US)

( * ) Notice: Subject to any disclaimer, the term of this patent is extended or adjusted under 35 U.S.C. 154(b) by 0 days.

(21) Appl. No.: 09/298,336

(22) Filed: Apr. 23, 1999

(51) Int. Cl.$^7$ ................................................ G06K 9/40
(52) U.S. Cl. ........................................ 382/254; 386/68
(58) Field of Search ................................ 382/254, 256; 386/68

(56) References Cited

U.S. PATENT DOCUMENTS

| | | | |
|---|---|---|---|
| 5,076,584 A | 12/1991 | Openiano | 463/36 |
| 5,386,493 A | * 1/1995 | Degen et al. | 704/267 |
| 5,557,724 A | 9/1996 | Sampat et al. | 725/43 |
| 5,623,588 A | 4/1997 | Gould | 345/787 |
| 5,745,710 A | 4/1998 | Clanton, III et al. | 725/60 |
| 5,805,806 A | 9/1998 | McArthur | 709/250 |
| 5,828,788 A | 10/1998 | Chiang et al. | 382/239 |
| 5,828,995 A | * 10/1998 | Satyamurti et al. | 358/1.18 |
| 5,864,868 A | 1/1999 | Contois | 707/104.1 |
| 5,892,966 A | 4/1999 | Petrick et al. | 712/36 |
| 6,289,165 B1 | * 9/2001 | Abecassis | 386/46 |

OTHER PUBLICATIONS

Sack & Davis, "IDIC: Assembling Sequences From Story Plans And Content Annotations," URL: http://wsack.www.-media.mit.edu/people/wsack/idic.html, (undated, but known to have been at this URL since Oct. 1998).

* cited by examiner

Primary Examiner—Moustafa M. Meky
(74) Attorney, Agent, or Firm—Silicon Valley IP Group; Kevin J. Zilka

(57) ABSTRACT

One aspect of the invention is a method for playing a stored content providing a plurality of segments which collectively contains the stored content, each segment has using first terminus and a second terminus with the content having a temporal flow from the first terminus to the second terminus. At least one segment is associated with a plurality of links to other segments. The method includes playing at least one segment with the temporal flow, determining whether a content expansion is desired prior to reaching the second terminus. If the content expansion is desired, then linking to an expansion segment and playing the expansion segment. If the content expansion is not desired, then linking to a continuing segment and playing the continuing segment. The method includes an additional link from the expansion segment to the continuing segment such that the continuing segment is played after the expansion segment has been played. Other aspects of the invention include other methods for playing stored content, for capturing and playing content, capturing segment and linkage descriptions, storage devices of the segment content, storage mechanisms referencing the continuous media content by segments and linkages and apparatus for capturing and playing continuous media content.

34 Claims, 16 Drawing Sheets

Figure 9A

| Segment ID 342 | First Terminus 344 | Second Terminus 346 | Continuity Link 348 | Expansion Link Pointer 350 | ⌐340

Figure 9B

| Expansion Segment ID 352 | Cue Definition 354 | Expansion Link Pointer 356 | Continuity Link Offset 358 | ⌐462

Figure 9C

| 360 | 362 | 364 | 366 | 368 |
|---|---|---|---|---|
| 370 | 372 | 374 | 376 | 378 |
| 380 | 382 | 384 | 386 | 388 |
| 390 | 392 | 394 | 396 | 398 |
| 400 | 402 | 404 | 406 | 408 |
| 410 | 412 | 414 | 416 | 418 |

⌐420

| 422 | 424 | 426 |
|---|---|---|
| 428 | 430 | 432 |
| 434 | 436 | 438 |
| 440 | 442 | 444 |
| 446 | 448 | 450 |
| 452 | 454 | 456 |

| Play Segment | Continuity Link | Expansion Link List | Link Stack Link | |
|---|---|---|---|---|
| | Link (Segment) | Link (Segment) | (Segment) | ~580 |
| 100 | 114 (104) | 116 (102) | Empty | |
| | | None | | ~582 |
| 102 | 118 (Non-Segment) | None | 114 (104) | ~584 |
| 104 | 122 (Non-Segment) | None | Empty | ~586 |

METHOD AND STORAGE DEVICE FOR EXPANDING AND CONTRACTING CONTINUOUS PLAY MEDIA SEAMLESSLY

BACKGROUND OF INVENTION

This invention pertains to the storage and interactive playing of segmented continuous play media sequences, and more particularly to digitally stored interactive multimedia content.

Continuous play media ("multimedia") can be defined as minimally containing a stream of image or text content forming a perceived continuity when presented to an observer/user. Continuous play media may further contain content streams forming perceived audio continuities when presented to an observer/user. Continuous play media may further contain other content streams including but not limited to closed captioned support for the acoustically impaired or closed captioned presentation of dialogue in one or more alternative languages.

Image content streams as used herein will include but not be limited to motion video streams as well as streams of text moving with regards to the displayed view available to the user/observer. Programs may generate these image streams, where the displayed view is altered in a manner rendered essentially continuous. Implementation environments for such generating programs include but are not limited to language environments for C, C++, Java, Lingo™ by Macromedia as well as various low level machine independent and/or machine dependent assembly languages. Examples of such implementations include but are not limited to motion picture preambles and postambles, often incorporating still images, textual credits and copyrights often further accompanied by music with a motion background or moving text providing a sense of continuity to the user/observer. Such image content streams may be further accompanied by acoustic effects which augment, and in some cases, establish the sense of continuity experienced by the user/observer.

Contemporary technology has driven down the cost of storing continuous play media, allowing the recording of large amounts of audio-video content onto a compact disk or DVD disk by a growing number of people, businesses and institutions. Continuously play media recordings and the playing of such recordings began in large numbers with the video tape players and their successors, Video Cassette Recorders (VCRs). Such technologies could record and play one to several hours of television grade audio-video content. The user could control the player to rewind, fast forward, pause, stop and start at a given moment in the recorded presentation. Many of these units could record material, usually received from a television signal, as well as play pre-recorded material. Standard implementations of this technology record or play only one multi-media stream at a time without multiplexing schemes supporting multiple simultaneous streams.

More recently, digital continuous play media technologies based upon image compression techniques such as QuickTime™ by Apple, MPEG 1, MPEG 2 and DVD have become quite popular. Such technologies are typically used to create a single long playing sequence, such as a motion picture, documentary or training session. User controls for playing such recordings are very similar to earlier controls found on video tape players and VCRs. All of these prior methods of playing and storing continuous play media have a limitation in presenting complex subjects, namely that there presentation is flat, there is no way for the user/observer to alter the stream to delve into a topic as a contiguous part of the stream.

The Internet and World Wide Web have accelerated the proliferation of hypertext documents. Hypertext possesses highlighted triggers embedded into a viewed document, which when selected, cause the document viewer to display a different view of either the same document or a different document. There is a "back" button on most hypertext viewing systems, which when pushed, causes the view to return to the previous view. These hypertext documents are rapidly creating a new class of interactive documents, allowing a much higher level of complexity to be traversed by readers of greatly varying backgrounds. People may follow many of the hypertext links, or few of the hypertext links depending upon their preferences. However, the approach of hypertext is not continuous play media, it does not create audio-visual streams, but screens of text and pictures primarily, which only move when the user/observer urges them to move. When a hypertext document references a continuous play media file, such as a Quicktime file, it is loaded and played with controls much as a VCR possesses.

Television, long one of the dominant cultural forces in image content presentation has reached a difficult impasse. Television in the United States is largely supported by revenues from advertising. The Internet threatens such revenues. The reason is that many perceive the Internet as a better basis for advertising because people who are interested in a product can find out what they want to know about the product as they wish to find it out via hyper links. Today's television advertising is constrained to present sound bites of very short duration possessing no ability for the potential customer to direct an inquiry into facts they wish to know. Instead, television today forces repeated transmission of the same limited amount of information, never getting beyond the simplest of messages concerning a product. What is needed is a method by which an advertiser's purchased bandwidth can be more efficiently utilized to permit potential customers to query a larger cross section of information about the products advertised while insuring that the basic product pitch is seen.

FIG. 1 displays a relevant prior art system comprising an enclosure 10, housing a display device 12, selector device 14, and communication (16 and 18) between selector device and system plus speakers (20). Enclosure 10 is shown herein with minimal detail by way of illustration. In practice, prior art system enclosures relevant to this invention include but are not limited to television-style cases, desktop computer enclosures, notebook computer enclosures. Many of these enclosures 10 incorporate speakers 20 without them being perceived separately as indicated in this figure. Note that there are a number of systems containing more than one enclosure, such as a number of desktop computers, televisions with set top boxes and often, additional content players such as DVD players.

Relevant prior art display devices 12 are also widely varied in form and specifics of operation. Relevant prior art display devices 12 may present black and white or color images. Relevant prior art display devices 12 may support either a vector or raster format. Relevant prior art display devices 12 may present images in either a 2-D, 3-D or multi-dimensional presentation view or collection of views.

Relevant embodiments of selector device 14 include but are not limited to contemporary television channel selectors, home entertainment center remote controls, computer pointing devices including but not limited to 3-D and 2-D mouse-style pointers, pen tablets, track balls, touch pads, key pads and joysticks. As illustrated in FIG. 1, the selector device communicates via physical transport mechanism 16 with an interface 18 housed in enclosure 10. Relevant physical transport mechanisms 16 include but are not limited to infra-red, micro-wave and other similar wireless transport layers, as well as wires and optical fiber. The mechanism by which communication is carried out based upon the specific physical transport mechanism employed is not relevant to this invention and will not be discussed for that reason. Additional IO devices such as printers and keyboards may be attached to various relevant, prior art systems. Keyboards may house touch pads and mouse sticks which in certain cases are the relevant selector device of that system.

FIG. 2 displays a block diagram of an exemplary prior art system such as displayed in FIG. 1. The units (12, 14, 20, 36 and 44) on the left side of this figure all have a major role in the input and output flows processed and controlled by the second column of units (24, 18, 32, 40 and 48), respectively. The data transport mechanisms between units (12, 14, 20, 36 and 44) and units (24, 18, 32, 40 and 48) are represented by arrows (22, 16, 30, 38 and 46), respectively. These units interact with each other and an overall control circuit labeled digital processor 56 via arrows representing buses (26, 28, 34, 42, 50, 52 and 54). Digital processor 56 in turn has RAM 62 and Nonvolatile memory 66 which it controls and uses to direct the overall operation of relevant prior art systems via buses designated as arrows (58, 60, 64 and 68).

Relevant prior art display devices 12 may present black and white or color images in either a vector or raster format representing images in either a 2-D, 3-D or multi-dimensional presentation view or collection of views. Relevant display data transport 22 includes but is not limited to NTSC, PAL or various HDTV television protocols of either analog or digital formats, as well as digital and analog RGB and various flat panel display interface protocols as are often used with computer displays. Many systems today possess a specialized display controller 24, which often incorporates one or more temporary frame buffers and MPEG decoding acceleration technology as well as acceleration technology for a variety of graphics operation. The communication mechanism 26 by which these units interact with the rest of an exemplary prior art system include but are not limited to microcomputer busses such as PCI and AGP as well as dedicated communication paths represented within line 52.

The selector device 14, selector device communication mechanism 16 and selector interface 18 have been discussed above. The communication between the selector interface 18 and the rest of the system is denoted by arrow 28. Embodiments of arrow 28 include but are not limited to addressable interfaces on computer busses including but not limited to ISA, PCI and USB.

Relevant prior art speakers 20 communicate with audio generator 32 via arrow 30. Arrow 30 designates communication mechanisms including but not limited to analog signaling or digital signaling. Arrow 30 communications may be physically transported by wireline technology including but not limited to twisted wire pairs and coaxial cabling, as well as wireless technology including but not limited to short range radio and infra red mechanisms. Audio generator 32 may perform decoding functions such as translation of encoded MPEG audio streams delivered by arrow 34 from the overall internal communications network 52 possibly from the player controller 40 or external interface 48 or display controller 24. Power amplification of the audio signals may be done either by audio generator 32, within the speakers 20 or involve both. Embodiments of the audio generator interface 34 to the internal communications network 52 include but are not limited to addressable interfaces on computer busses including but not limited to ISA, PCI and USB.

Relevant, prior art content player 36 communicates with content controller 40 via arrow 38. Content player 36 embodiments include but are not limited to optical disk players and electromagnetic disk players of either a removable or non-removable media. These content players 36 embodiments further include but are not limited to CD ROM, MPEG and DVD players. Such content player 36 embodiments may further include the ability to write to the storage media as well as play the storage media. Relevant player controller 40 embodiments include but are not limited to various SCSI controllers, specialized optical disk controllers, specialized hard disk controllers and RAID disk array controllers. Player controller 40 embodiments may further include but are not limited to various continuous play media compression decoders: MPEG decoders and DVD decoders. Relevant prior art communications mechanisms 38 include but are not limited to various SCSI, RAID, ISA and EISA interfaces.

Relevant prior art player controllers 40 often, but not always, partition a continuous play media stream received via 38 from content player 36 into an audio stream and a video stream. The audio stream is sent via communication path (arrows 42 to 52 to 34) to audio generator 32 to drive speakers 20. This communication path may be incorporated into an overall bus protocol, or be a separate signal path, depending upon the specific implementation. The video stream would be sent via communication path (arrows 42 to 52 to 26) to display controller 24 to drive display 12. The actual decoding of the video stream is often done primarily in display controller 24, but in certain instances, digital processor 56 and player controller 40 may contribute to the video decoding process. There are also situations in which relevant prior art systems employ display controller 24 to partition a continuous play media stream into separate one or more audio streams and at least one video stream. Such systems include many set top box architectures.

Note that in relevant prior art systems, there may be more than one content player 36 with potentially distinct player controllers 40 and communication paths 38. One content player 36 might support a writeable CD ROM using a SCSI 38 based controller 40 as well as a second DVD-ROM player with its own cabling 38 and player controller 40.

Another relevant source of continuous play media content is provided via external content 44 communicating with external interface 48 via arrow 46. One relevant external interface 48 is a radio frequency (RF) tuner. Relevant RF tuners 48 include but are not limited to demodulators and/or modulators for various broadcast protocols such as Frequency Modulation (FM), Frequency Division Multiple Access (FDMA), Time Division Multiple Access (TDMA), various spread spectrum protocols, Wavelength Division Multiple Access and wavelet division multiple access. Relevant spread spectrum protocols further include but are not limited to Direct Sequence, Frequency Hopping, Time Hopping and Wideband CDMA. These relevant RF tuners may be connected 46 by wireline or wireless physical transport layers. Relevant wireline physical transports include but are limited to twisted pair, coaxial cable and various optical fiber mechanisms. Relevant wireless physical transports 46 include contemporary broadcast television, High Definition TV (HDTV), as well as various radio frequency, microwave and infra red schemes which may well incorporate an antenna, sensor or array of antennas or sensors.

Another relevant external interface 48 is a modem. Relevant modems include but are not limited to telephone line modems incorporating various transceiver rates which may not be the same for reception as for transmission, as well as various DSL, ADSL, XDSL, ISBN, Ethernet, Token Ring and ATM interfaces. Physical transport layer 46 for modems include but are not limited to wire line and wireless transport layers. Wire line physical transport layers 46 include but are not limited to telephone lines, twisted pair wire lines, coaxial cabling and various optical fiber technologies. Wireless transport layers 46 include but are not limited to directional and non-directional radio, microwave, infrared and optical schemes.

The external content 44 may be located a substantial distance away from the enclosure 10. The external content 44 is often embodied in many circumstances within a server supporting a network of user systems via interconnections 46 of these external interfaces 48. Such networks may well support TCP/IP thereby enabling support for the Internet. Such networks may further support one or more Intranets. Such networks may further support one or more Extranets.

Another form of external content 44 includes video input devices. These often possess external interfaces 48, which include video frame capturing circuitry. Such external interfaces 48 are now including advanced image processing, often further supporting MPEG compatible compression of the captured video stream.

Note that in many relevant prior art systems, there is more than one kind of external content 44 and external interface 48 with potentially different communication paths 46. A desktop box might possess both a RF tuner using an antenna as well as an optical fiber interface to a cable television provider. A notebook computer might well have both a telephone line modem and an Ethernet LAN interface.

Relevant prior art digital processor 56 embodiments include but are not limited to one or more of the following: general purpose microprocessors, Digital Signal Processors (DSPs), parallel processors, embedded controllers and special purpose system controllers. General purpose microprocessors include but are not limited to various word width Complex Instruction Set Computers (CISC) and Reduced Instruction Set Computers (RISC). DSPs include but are not limited to various word width computers employing instruction sets allowing at least one add/subtract operation as well as at least one operation comparable to multiplication to be performed in a single instruction cycle. Parallel processors include but are not limited to Single Instruction Multiple Datapath (SIMD), Multiple Instruction Multiple Datapath (MIMD), and hybrid SIMD/MIMD organizations of either uniform or non-uniform processors. Uniform processor parallel processors employ essentially the same processor uniformly. Non-uniform processor parallel processors do not employ essentially the same processor throughout. Embedded controllers often incorporate either one or more microprocessors or DSPs along with additional circuitry performing specialized data processing, which may include but is not limited to MPEG stream partitioning and/or decoding, copy protection processing, decryption, authentication and block data error detection and correction. Special purpose system controllers include but are not limited to various implementations as Programmable Logic Arrays (PLAs), Complex Programmable Logic Devices (CPLDs), Field Programmable Gate Arrays (FPGAs), Application Specific Integrated Circuits (ASICs) and Application Specific Standard Products (ASSPs).

Relevant prior art digital processors 56 often possess local memory resources in the form of RAM 62 and nonvolatile memory 66, interfaced via busses 58, 60, 64 and 68. The RAM may include but is not limited to various forms of RAM and one or more caching banks of RAM. Relevant prior art digital processor 56 embodiments may include but are not limited to one or more of memory caches physically proximate to and possibly contained within the digital processor 56 package or packages. Memory caching may include but is not limited to separate caching of memory and data. Memory caching may further include but is not limited to multiple layers of cache structures. Distinct processors within the digital processor 56 may further possess distinct caches as well as further localized memory which may in turn include RAM and/or nonvolatile memory. Relevant prior art nonvolatile memory may include but is not limited to boot ROMs and flash memory circuits which may further emulate disk drives with a form of file management system. Such nonvolatile memory 66 embodiments may be used to initialize the system as well as provide security and accounting information or store content.

From the user perspective, relevant prior art systems play continuous play media content recordings much as did predecessor VCR systems. They can start at the beginning, or partially through a sequence, and progress forward pausing, stopping and possibly rewinding. Internet access has allowed hypertext-based web sites to provide hot keys supporting the downloading and playing of continuous play media sequences, but again, once downloaded, the continuous play media sequence playing controls are essentially those found on a VCR. Modern television, particularly cable and satellite broadcast television possesses a fairly large number of channels, often over a hundred, to be multiplexed and modulated at the broadcast site and demodulated at the customer/user site into these separate channels. The signal protocols in common use deserve some discussion. These relevant, prior art television channels tend to employ an MPEG continuous play media stream, with an audio stream and a video stream component.

Consider first what happens in the video stream. MPEG video compression mechanisms utilize an initializing video frame compressed in a manner similar to a still frame, followed by motion compensation data essentially transforming this initial frame into a succession of subsequent motion frames. Every so often, a new initializing frame is sent, followed by motion compensation data again transforming the new initial frame into a new sequence of subsequent motion frames. The compression ratios compared to the raw data are impressive, often a reduction in data size of 200 to 1 can be achieved without noticeable loss of visual clarity. This compression ratio enables this large number of channels to be cost effectively broadcast by satellite and cable television companies.

Consider what happens when someone changes television channels. The MPEG stream of the new channel is isolated and demodulated from the television broadband transmission into a video stream and an audio stream. The video stream is scanned until the next initializing video frame is encountered. Once encountered, the MPEG video decoder initializes its output stream and motion video frames follow shortly from this initialization frame. These initialization frames occur frequently enough that there is a barely noticeable delay between when one turns to a new channel and the channel's video stream is being displayed. If at this point, the channel is again changed, a short time later there is another initialization video frame observed, the motion frame sequencing begins again. However, there is no mechanism to compensate for or retain whatever has transpired on the original channel. Once these motion frame sequences have passed by, they are gone.

The audio streams also possess an initialization structure which is asserted from time to time, followed by the time varying incremental audio stream modifications. While the audio and video frames do not necessarily initialize simultaneously, there are synchronization controls between them to facilitate time-aligning them to each other. Taken collectively, there is a certain rationale in considering contemporary continuous play media to be segmented. The block coding used in both transmission and storage of digital continuous play media reinforces the sense of segmentation of continuous play media into short sequences of motion frames (video stream) and the associated audio stream. However, there are no embedded cues within these streams to indicate expansion possibilities or to direct such expansions, or direct the return to provide continuity with the original stream segments.

What is needed is a method of playing and storing a segmented continuous play media stream which expands and contracts the viewing material based upon the user/observer's and/or system/agent(s)' selections.

SUMMARY OF THE INVENTION

One aspect of the invention is implemented as a method for playing a stored content providing a plurality of segments which collectively contains the stored content. Each of the segments has a first terminus and a second terminus, where the content in each of the segments has a temporal flow from the first terminus to the second terminus. At least one segment is associated with a plurality of links to a corresponding plurality of other segments.

The method includes playing at least one segment with the temporal flow, determining whether a content expansion is desired prior to reaching the second terminus. If the content expansion is desired, then linking to an expansion segment and playing the expansion segment. If the content expansion is not desired, then linking to a continuing segment and playing the continuing segment. The method includes an additional link from the expansion segment to the continuing segment such that the continuing segment is played after the expansion segment has been played.

This method is advantageous in providing the user and content provider with a much greater degree of freedom in traversing the content provided. Topics can be expanded upon user request. The individual who wants to know about the gas ant mileage of an automobile shown in a commercial may find out about it, whereas someone interested in the safety features can delve into that while the advertiser is assured that the basic advertising pitch will be presented in a cinematic fashion.

Another aspect of the invention includes a method for playing a stored content providing a plurality of segments which collectively comprise the stored content. Each of the segments has a first terminus and a second terminus and a continuity link associated with a member of the collection of a segment indicator and a non-segment indicator. Content in each of the segments has a temporal flow from the first terminus to the second terminus. At least one segment is associated with a plurality of expansion links to a corresponding plurality of other of the segments.

The method of playing includes: Playing the at least one segment with the temporal flow. Determining whether a content expansion is desired prior to reaching the second terminus. If the content expansion is desired, then linking to an expansion segment, pushing the continuity link onto a link stack and playing the expansion segment. If the content expansion is not desired and if the continuity link indicates the continuing segment then linking to a continuing segment and playing the continuing segment.

This method is advantageous in providing the user and content provider with a much greater degree of freedom in traversing the content provided. Topics can be expanded upon user request. The individual who wants to know about the gas mileage of an automobile shown in a commercial may find out about it, whereas someone interested in the safety features can delve into that while the advertiser is assured that the basic advertising pitch will be presented in a cinematic fashion.

This method is further advantageous in providing the ability to share an expansion segment or collection of nested expansion segments in more than one segment designating the same expansion segment. Such segments capable of being shared as expansion segments are indicated by continuity segment links indicating a non-segment.

Another aspect of the invention includes a storage device for a segmented continuous play media stream containing at least three segments. Each segment contains a first terminus and a second terminus. The segmented continuous play media stream within each segment progresses from the first terminus to the second terminus.

At least one segment of the storage device contains a plurality of links to a corresponding plurality of other segments further comprising a continuation link and at least one expansion link. A cue is associated with each of the expansion links. Each cue may be stored in the containing segment substantially before the segmented continuous play media stream progresses to the second terminus of the containing segment. The segmented continuous play media stream of the containing segment progresses to the first terminus of the corresponding continuation link segment after progress to the containing segment second terminus. The segmented continuous play media stream of the containing segment progresses to the first terminus of the corresponding expansion link segment after progress to the containing segment second terminus.

Such a storage device is advantageous for providing segmented continuous play media which may by played by the above methods which provide a much greater degree of freedom in traversing the stored content. Topics can be expanded upon user request. The individual who wants to know about the gas mileage of an automobile shown in a commercial may find out about it, whereas someone interested in the safety features can delve into that while the advertiser is assured that the basic advertising pitch will be traversed in a cinematic fashion.

Another aspect of the invention includes a storage mechanism referencing a continuous play media stream segment store containing a collection of at least three segment descriptors and a collection of at least one expansion link element.

Each of the segment descriptors of the storage mechanism contains a first terminus, a second terminus and a continuity link. The first terminus referencing a first time point of a continuous play media stream segment contained in the continuous play media stream segment store. The second terminus referencing a second time point of the continuous play media stream segment contained in the continuous play media stream segment store. The continuity link represents one of a collection containing an indicator of another of the segment descriptors and an indicator to a non-segment.

Each of the expansion link elements of the storage mechanism contains an expansion segment indicator, an expansion cue indicator and an indicator of another of the expansion link elements or of a non-expansion link element. Each of the segment descriptors further contains an indicator of an expansion link element.

Such a storage mechanism is advantageous for providing segmented continuous play media which may by played by the above methods which provide a much greater degree of freedom in traversing the stored content. Topics can be expanded upon user request. The individual who wants to know about the gas mileage of an automobile shown in a commercial may find out about it, whereas someone interested in the safety features can delve into that while the advertiser is assured that the basic advertising pitch will be traversed in a cinematic fashion.

Such a storage mechanism is further advantageous in supporting more than one mechanism whereby alternative traversal of a common continuous play media library is provided. One traversal of a television soap opera library may focus on character evolution, whereas another may focus on family relationships and another, on adulterous relationships. Such traversals would reference the common continuous play media library, but establish at least partially divergent expansions.

Another aspect of the invention includes a method for capturing and playing a continuous content including capturing a plurality of segments, playing at least one stored content segment, determining whether a content expansion is desired, linking to other segments and playing other segments.

The method includes capturing of at least one continuous play media stream collectively contains the continuous content providing corresponding stored content segments each having a first terminus and a second terminus, where the content has a temporal flow from the first terminus to the second terminus. At least one segment is associated with a plurality of links to a corresponding plurality of the other segments.

The method further includes playing the stored content segment with temporal flow and determining whether a content expansion is desired prior to reaching the second terminus. If the content expansion is desired then linking to an expansion segment and playing the expansion segment of stored content. If the content expansion is not desired then linking to a continuing segment of stored content and playing the continuing segment of stored content. There is an additional link from the expansion segment of stored content to the continuing segment of stored content such that the continuing segment of stored content is played after the expansion segment of stored content has been played.

This method advantageously provides for the capturing of a continuous play media stream content and playing of that content. Different users can play and expand the content based upon their individual choices. By way of example, a viewer of a sporting event may chose to expand recent performances of a team or team member, whereas another viewer may chose to examine recent news and interviews with a coach or team manager.

A further advantage of this method is the ability for selected advertising to gain in depth rather than just repeat or rotate the same prespecified commercial content with no added informational depth on demand. This supports a smarter use of advertising content, providing advertisers with the ability to build up information content, with a kinesthetic interface to expand and examine selected details otherwise unavailable through a media such as television as it is known today.

Another aspect of the invention includes a method of capturing references to a continuous play media stream segment store including capturing a collection of at least three segment descriptors and capturing a collection of at least one expansion link elements.

Each of the segment descriptors of the method includes a first terminus, a second terminus and a continuity link. The first terminus references a first time point of a continuous play media stream segment contained in the continuous play media stream segment store. The second terminus references a second time point of the continuous play media stream segment contained in the continuous play media stream segment store. The continuity link represents one of a collection including an indicator of another of the segment descriptors and an indicator to a non-segment.

Each of the expansion link elements of this method includes an expansion segment indicator, an expansion cue indicator and an indicator of either an indicator of another of the expansion link elements and an indicator of a non-expansion link element. Each of the segment descriptors further includes one of the indicators of one of the expansion link element.

This method advantageously provides for the capture of references to a continuous play media stream segment store supporting differing expansion services. In a sporting event expansion service: one service may support recent sporting performances, another might incorporate performance statistics and a third might support recent interviews and expert commentary related to specific players or teams.

Another aspect of the invention includes an apparatus to store and play a continuous play media stream including an external interface circuit, a writeable content store, a digital controller, a display circuit and a selector circuit. The external interface circuit receives at least one continuous play media stream segment. The writeable content store is coupled to the external interface circuit by which the segments of the received continuous play media stream may be transferred and stored. The digital controller is coupled to the external interface circuit and is coupled to the writeable content store. The digital controller further contains a link segment association table. The display circuit is coupled to the digital controller. The display circuit is further coupled to the writeable content store. The selector circuit is coupled to the digital controller sending selector data to the digital controller.

The digital controller of the apparatus controls the writeable content store and the display circuit to transfer the stored continuous play media stream segment to the display circuit based upon the selector data received by the digital controller and the link segment association table. The digital controller further controls the display circuit to play the transferred continuous play media stream segment by the display circuit based upon the selector data received by the digital controller and the link segment association table.

The apparatus has the advantage of being able to capture a live stream and perform content expansions without losing the live content. This apparatus provides the necessary architectural capabilities to archive continuous stream segments locally to build a continuous play media store.

Another advantage of this apparatus is the minimal network overhead to maintain and extend a continuous play media store for an ongoing series of performances such as sporting events, episodes of a television series, news reports and interviews with celebrities and experts.

A further advantage of this apparatus is the ability for selected advertising to gain in depth rather than just repeat the same commercial content with no added informational depth. This apparatus supports a smarter use of advertising content, providing advertisers with the ability to build up information content on interested users local writeable content store, with a kinesthetic interface to expand and examine selected details otherwise unavailable through a media such as television as it is known today.

These and other advantages of the present invention will become apparent upon reading the following detailed descriptions and studying the various figures of the drawings.

BRIEF DESCRIPTION OF THE DRAWINGS

FIG. 9A depicts components included in a description of a segment in accordance with embodiment of the invention;

FIG. 9B depicts components included in a description of an expansion link;

FIG. 9C depicts a collection 420 of segment descriptions, a collection 460 of expansion links and a continuous play content store 470 in accordance with an embodiment of the invention;

FIG. 13 is a state table of a system in accordance with an embodiment of the invention utilizing flowcharts 10–12 and segment descriptions, expansion links and overall structure of FIGS. 9A, 9B and 9C to perform actions as represented in FIGS. 3A and 3B;

DETAILED DESCRIPTION OF THE PREFERRED EMBODIMENTS

Figure 1:
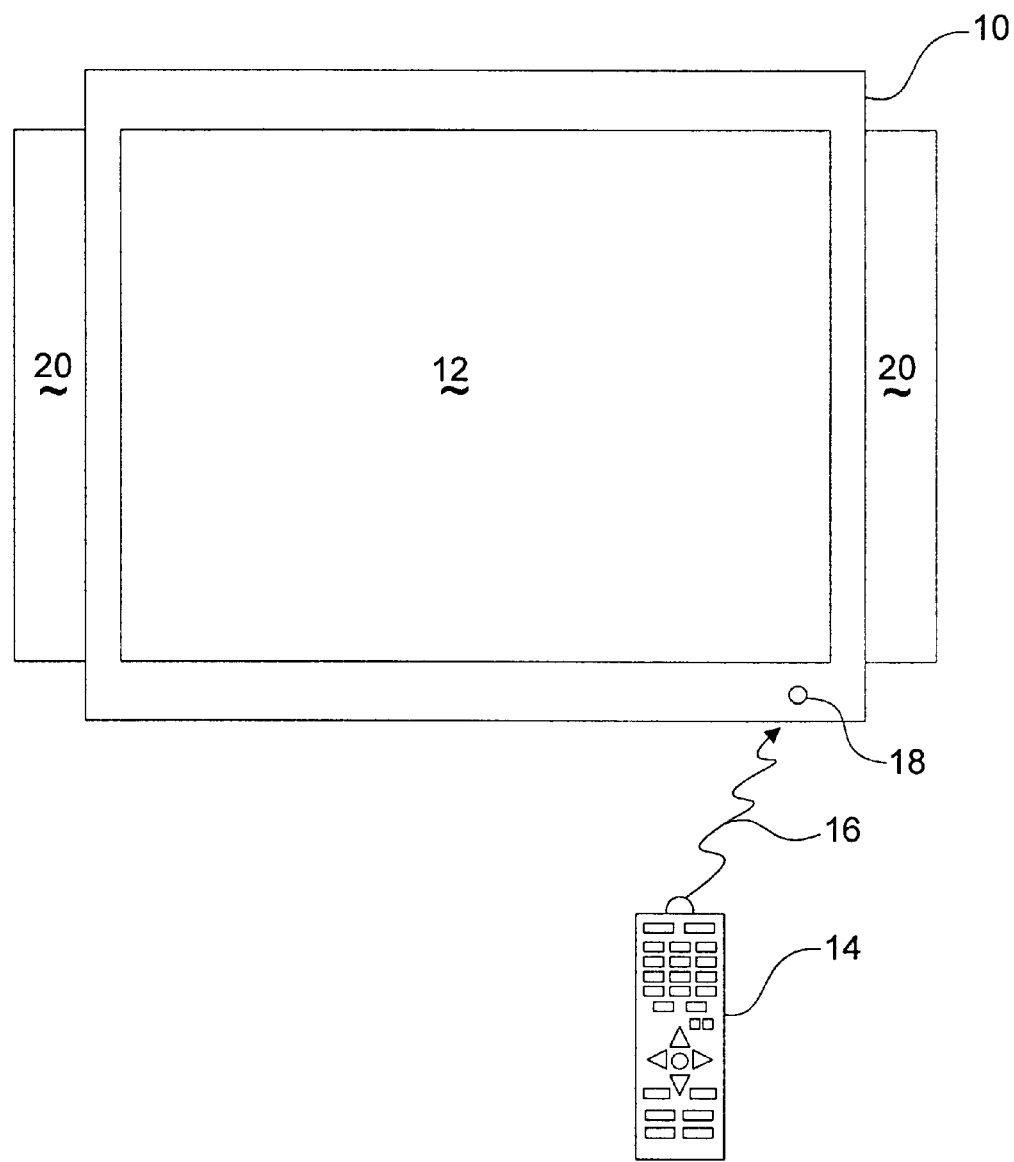
FIG. 1 displays a prior art system comprising a display device, selector device, communication between selector device and system plus speakers.
Figure 2:
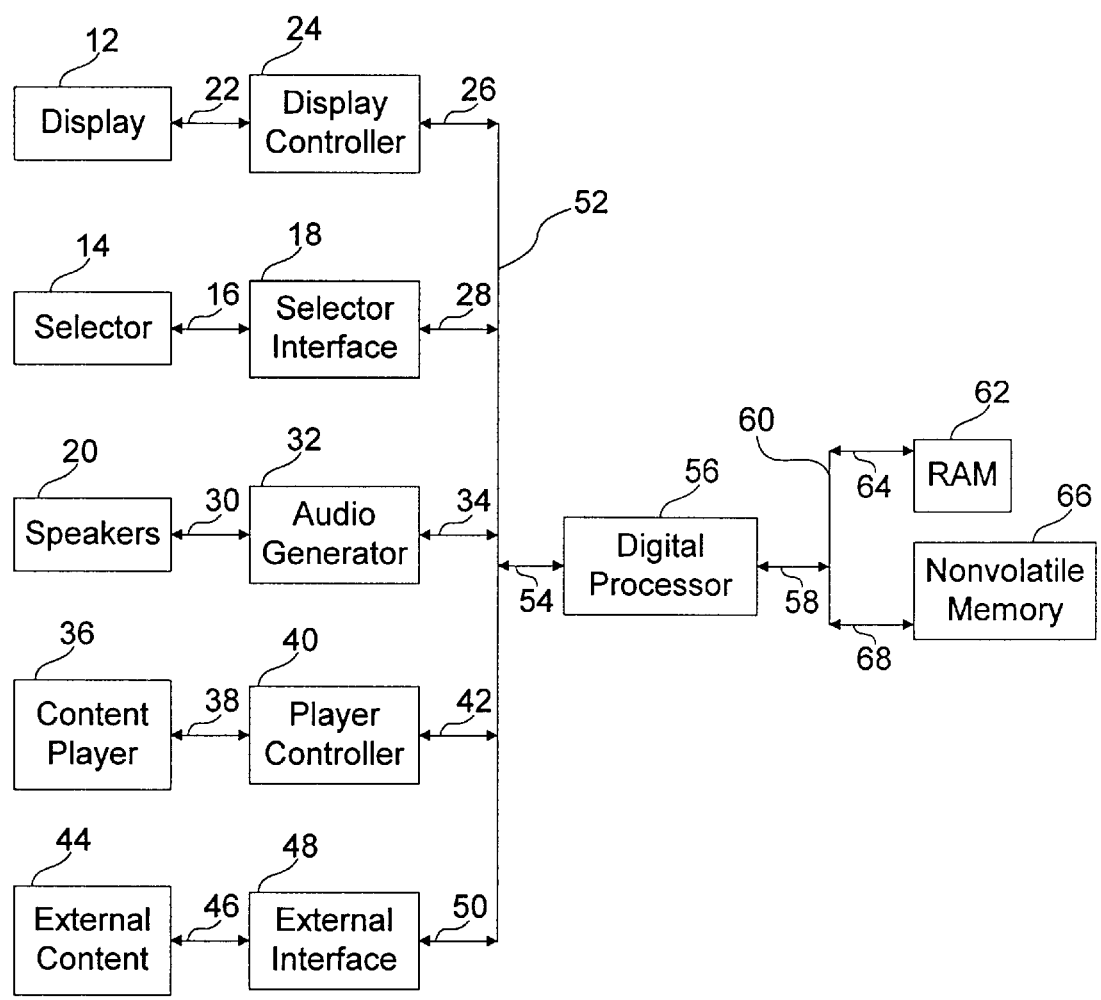
FIG. 2 displays a block diagram of an exemplary prior system such as displayed in FIG. 1.
Figure 3A:
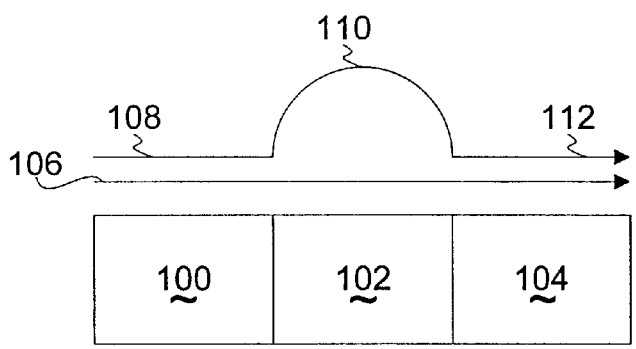
FIG. 3A diagrams a basic temporal flow either expanding or not expanding a segment in accordance with an embodiment of the invention.

FIGS. 1 and 2 were discussed with reference to the prior related art. FIG. 3A diagrams a basic temporal flow either expanding or not expanding a segment in accordance with an embodiment of the invention. Continuous play media segments 100, 102 and 104 can either be played in that order, as indicated by arrow 106, or playing continuous play media segment 102 can be followed by playing continuous play media segment 104 as indicated by the arrow composed of 108, 110 and 112. Component 108 indicates that continuous play media segment 100 is played. Component 110 indicates that segment 102 is not played, and that after at most a small amount of time, component 112 indicates that continuous play media segment 104 is played. Note that in certain preferred embodiments a transition between playing segment 100 to playing segment 102 may be observed by the user/observer. In certain other preferred embodiments, a transition between playing segment 102 to playing segment 104 may be observed by the user/observer.

Figure 3B:
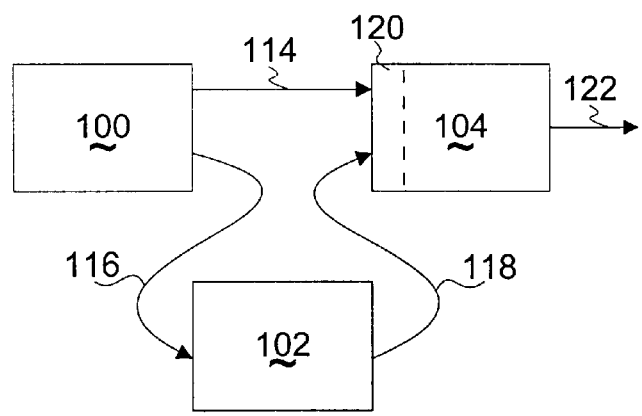
FIG. 3B schematically depicts the segment links between continuous play media segments of FIG. 3A.

FIG. 3B schematically depicts the segment links between continuous play media segments of FIG. 3A. Continuous play media segment 100 has two links 114 and 116 to other continuous play media segments. Continuous play media segment 100 contains a continuity link 114 to the start 120 of continuous play media segment 104. The temporal start of a segment or frame sequence will be denoted as the first terminus and the temporal end of a segment or frame sequence will be denoted as the second terminus hereafter. Continuous play media segment 100 contains an expansion link 116 to continuous play media segment 102. Continuous play media segment 102 contains a link 118 to continuous play media segment 104. In certain preferred embodiments of the invention, the link 118 may be explicitly incorporated in segment 102. In certain preferred embodiments, the link 118 may be implicitly derived from the remembered state of the content player during the playing of segment 100. In certain further preferred embodiments of the invention, this implicit derivation may be determined by a stack included in the content player and the indication to do this in certain preferred embodiments is a continuity link not indicating a segment. Segment 104 further contains a second terminus with a continuity link 122 in certain preferred embodiments of the invention.

Figure 4A:
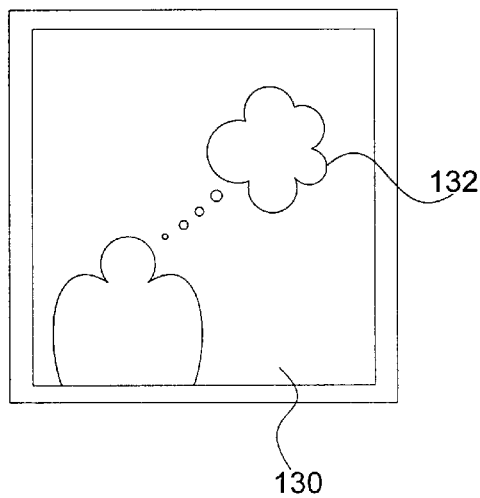
FIGS. 4A, 4B, 4C and 4D depict moments in a temporal flow as seen by an observer/user in accordance with an embodiment of the invention.

FIGS. 4A, 4B, 4C and 4D depict moments in a temporal flow as seen by an observer/user in accordance with an embodiment of the invention. FIG. 4A shows a continuous play sequence preceding the point of determining whether an expansion is desired in accordance with an embodiment of the invention. Visual cue 132 is seen against the basic continuous play sequence 130. By selecting this cue, the content of the continuous play expansion is chosen. The visual cue in certain preferred embodiments of the invention may be specifically chosen shapes. In certain preferred embodiments, the visual cues may be visually highlighted shapes. In certain preferred embodiments, the visual cues may be essentially stationary upon the viewed display. In certain preferred embodiments of the invention, the visual cues at least occasionally move with respect to the view display.

Figure 4B:
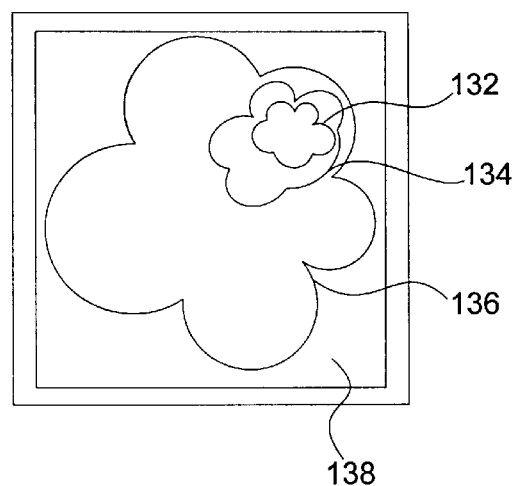

FIG. 4B shows the user view of the linking to the continuous play expansion content in accordance with an embodiment of the invention. Visual cue 132 is successively expanded as shown in sequence 132, 134 and 136 so that the background 138 is rendered essentially trivial, if not actually non-existent from the user's perspective. Such a sequence in certain preferred embodiments acts as a transition between the played segment in which the expansion request is determined and the expansion segment which is played in response to the expansion request.

Figure 4C:
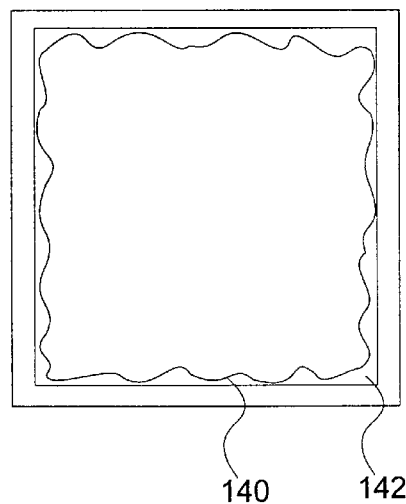

FIG. 4C shows the user view of the start of the continuous play expansion content in accordance with an embodiment of the invention. The expansion content is presented in region 140 of the display, with a minimal or non-existent background 142. In certain preferred embodiments of the invention, the minimal background 142 is used for presenting limited content messages. In certain further preferred embodiments of the invention, the minimal background 142 is further used to present advertising or announcements such as broadcast television storm warnings.

Figure 4D:
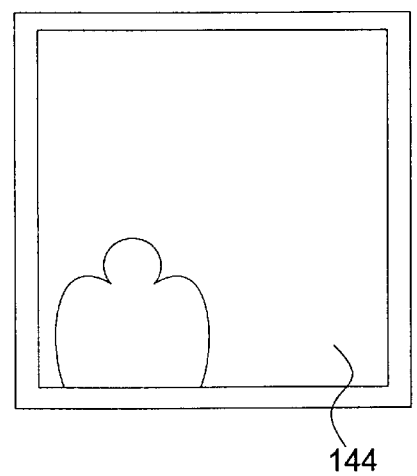

FIG. 4D shows the user view of the continuity segment after determination of whether to play the expansion content in accordance with an embodiment of the invention. Item 144 indicates the basic content of the continuous play media of the continuing segment without the previous expansion cue being presented. Note that if there was no selection of the expansion content during the sequence shown in FIG. 4A, then the sequence shown in FIG. 4D would be what the user would see rather than the material shown in FIGS. 4B and 4C. Note that in certain preferred embodiments of the invention, a transition such as depicted in FIG. 4B displayed as a sequence from 140 to 136 to 134 to 132 to 144 can act as a transition from the playing of the desired transition segment to playing the continuing segment as depicted with FIG. 4D.

Figure 5A:
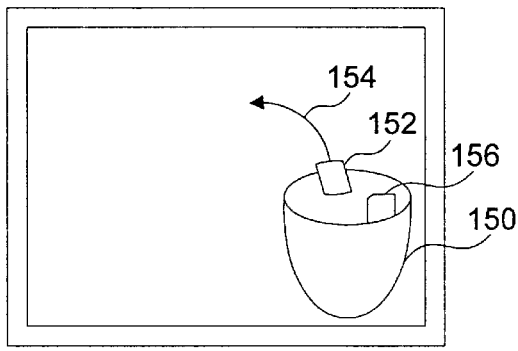
FIGS. 5A, 5B, 5C, 5D and 5E depict moments in a temporal flow as seen by an observer/user in accordance with an embodiment of the invention.

FIGS. 5A, 5B, 5C, 5D and 5E depict moments in a temporal flow as seen by an observer/user in accordance with an embodiment of the invention. FIG. 5A shows the user view of multiple expansion cues 152 and 156 further contained in an expansion cue container 150 in accordance with an embodiment of the invention where expansion cue 152 is being removed from expansion cue container 150. The visual cue container 150 in certain preferred embodiments of the invention may be specifically chosen shapes. In certain preferred embodiments, the visual cue container 150 may be visually highlighted shapes. In certain preferred embodiments, the visual cue containers 150 may be essentially stationary upon the viewed display. In certain preferred embodiments of the invention, the visual cue containers 150 at least occasionally move with respect to the viewable display. In another preferred embodiment, the motion 154 is part of the continuous play media stream.

Figure 5B:
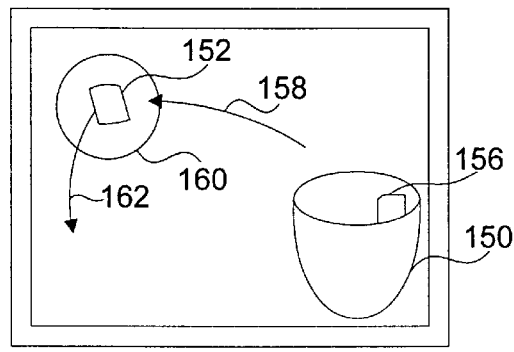

FIG. 5B shows the user view of multiple expansion cues 152 and 156 with expansion cue 156 contained in an expansion cue container 150 in accordance with an embodiment of the invention where expansion cue 152 is further highlighted 160. Visual cue 152 is highlighted as depicted by region 160. Arrows 158 and 162 denote motion of the visual cue 152 with respect to the viewable display. Such motions 158 and 162 in certain preferred embodiments of the invention may be caused by the user's action. In certain other preferred embodiments, the motion depicted by arrows 162 and 158 depict motion partially the result of action by the user 158 and partially the response of the system 162. In certain preferred embodiments of the invention, a visual cue 152 is only activated for response by removal from a visual cue container 150. In certain other preferred embodiments of the invention, visual cues within a visual cue container 150 become activated for selection when the user selects a visual cue container 150. Both motions 158 and 162 may be the result of the system responding to a selection regarding the expansion cue 152. In another preferred embodiment, the motions 158 and 162 are part of the continuous play media stream.

Figure 5C:
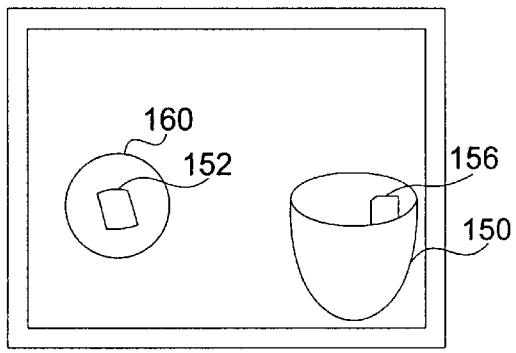

FIG. 5C shows the user view of multiple expansion cues 152 and 156 with expansion cue 156 contained in an expansion cue container 150 in accordance with an embodiment of the invention where expansion cue 152 is further highlighted 160. In certain preferred embodiments, a visual cue 152 when highlighted 160 may be selected by a user.

Figure 5D:
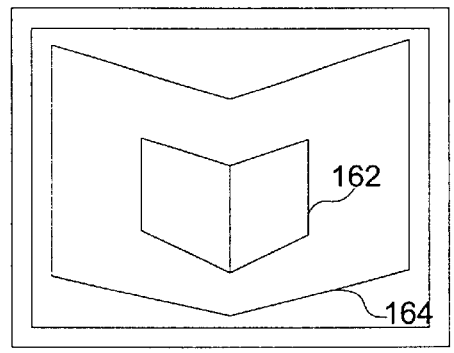

FIG. 5D shows the user view of multiple expansion cues 152 and 156 with expansion cue 156 contained in an expansion cue container 150 upon selecting expansion cue 152 and linking to expansion content is shown in sequence 162 and 164. User selection of visual cue 152 causes the visual cue, in this case, a wallet, to cause a content expansion. This content expansion has a transition sequence depicted by 162 and 164. The wallet is opened in 162 and then expands in size with 164.

Figure 5E:
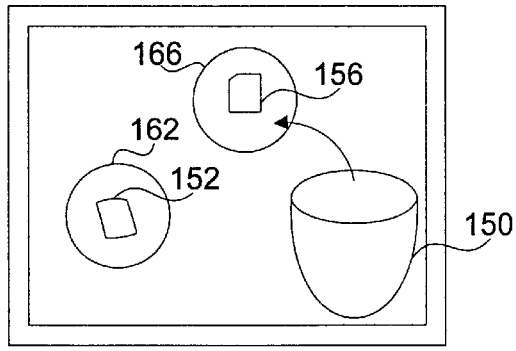

FIG. 5E shows the user view of multiple expansion cues 152 and 156 further contained in an expansion cue container 150 in accordance with an embodiment of the invention where expansion cue 152 is highlighted 160 and expansion cue 156 is removed from expansion cue container 150 and is further highlighted 166. The user moves visual cue 156 outside the visual cue container 150 in certain preferred embodiments. Once outside the visual cue container, the visual cue 156 becomes highlighted 166. In certain preferred embodiments of the invention the user can select to activate all the visual cues contained in a visual cue container by a specific selection. In certain preferred embodiments of the invention, the user can select to activate multiple visual cues contained in a visual cue container by a single selection. In certain further preferred embodiments of the invention, the activation of multiple visual cues may be done be selecting some shared property, including but not limited to performance statistics of the members of a sporting team or interviews with experts and stars, by way of example.

In certain embodiments, the container 150 is not interactively accessible. Container 150 in such embodiments may move or be manipulated only as shown in the continuous play media stream. Objects inserted into and/or removed from such containers may be highlighted to indicate possible selection for expansion. By way of example, a person interviewed may pull something from their handbag and it may be highlighted for possible expansion. In certain further preferred embodiments, the user may select the expansion. In other further preferred embodiments, the expansion selection may be automated.

Figure 5F:
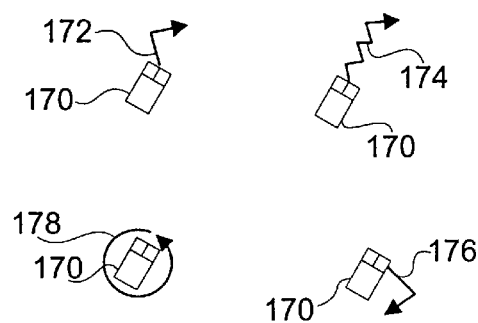
FIG. 5F depicts various selector device motions which in certain embodiments may serve to select a visual cue without necessitating pushing a button.

FIG. 5F depicts various selector device motions which in certain embodiments may serve to select a visual cue without necessitating pushing a button. Selector device 170 is shown engaged by the user in a variety of different motions not necessarily involving button pushing by which content may be selected in accordance with various embodiments of the invention. Motion 172 shows a motion in a first direction with a sharp change to a second direction essentially opposing to the first direction in accordance with an embodiment of the invention. Motion 174 shows a back and forth or zig-zag motion in accordance with an embodiment of the invention. Motion 176 shows a motion in a first direction with a sharp change to a second direction essentially opposing to the first direction in accordance with an embodiment of the invention where the first and second directions are essentially opposite of the corresponding directions of the motion 172. Motion 178 shows an essentially oval or circular motion in accordance with an embodiment of the invention. Note that these motions have been shown as essentially planar for the purposes of illustration alone. The portrayed motions may further be seen as curves in three dimensions in accordance with other preferred embodiments of the invention. The specifics of which motions have been portrayed are not meant to limit the invention to these specific selector motions, but instead indicate that user selection may be achieved in certain preferred embodiments of the invention without the necessity of pushing one or more buttons.

Figure 6:
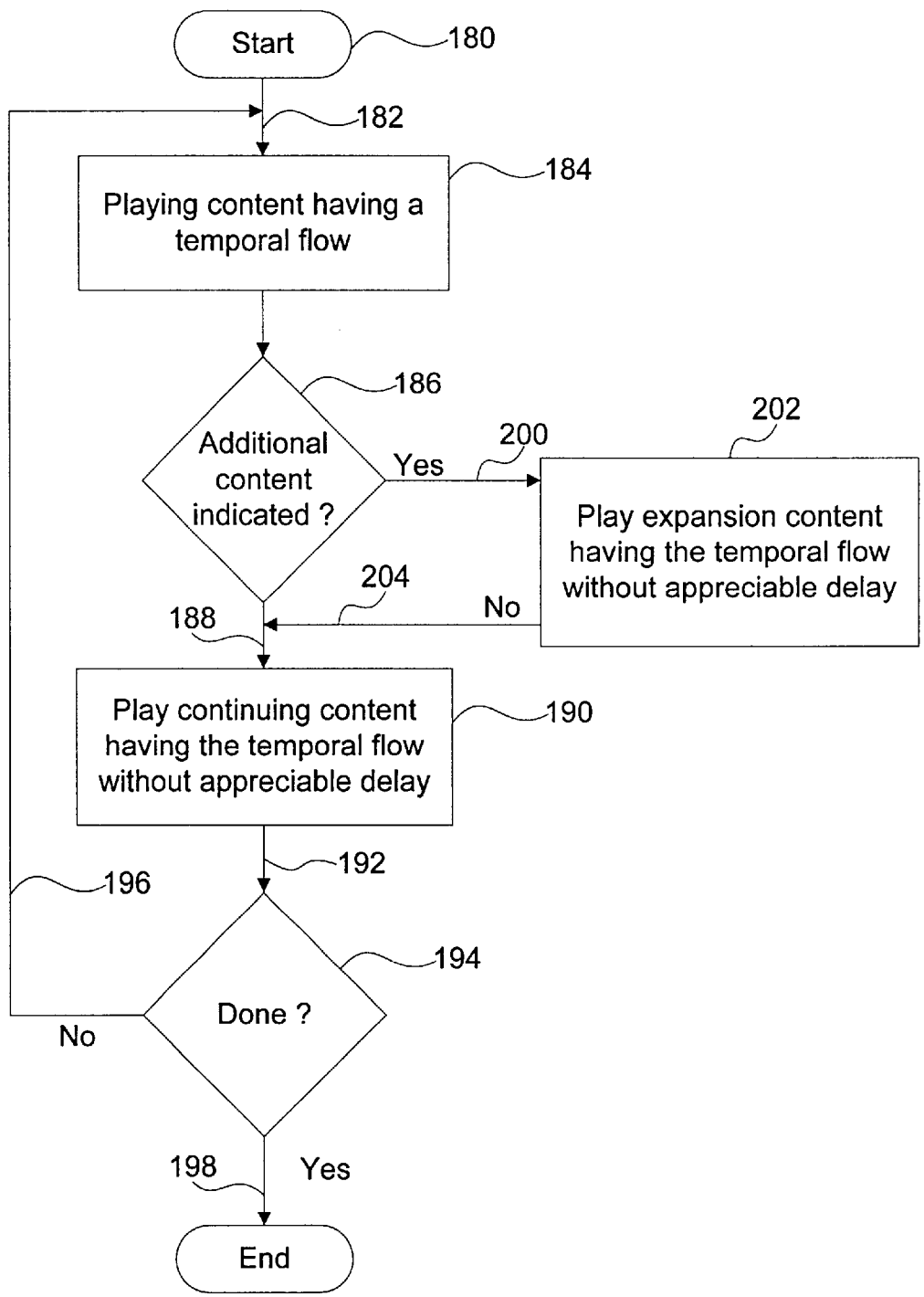
FIG. 6 is a flowchart of a method of playing segmented continuous play media content in accordance with an embodiment of the invention.

FIG. 6 is a flowchart of a method of playing segmented continuous play media content in accordance with an embodiment of the invention. Operation 180 designates starting the method, which in certain preferred embodiments of the invention may include but is not limited to allocating system resources.

Arrow 182 designates an iterative point in the method leading to the execution of operation 184. Operation 184 designates playing a content having a temporal flow, starting at one point in time and progressing to a later point in time, a segment of continuous play media. Operation 186 designates determining whether additional content has been indicated. Arrow 188 is followed when additional content has not been indicated, leading to execution of operation 190. Operation 190 designates playing the continuing content having the temporal flow without appreciable delay. In certain preferred embodiments of the invention, this entails a recursive execution of the operations starting at 180. Arrow 192 leads to the execution of operation 194, which determines if this method is done. If operation 194 determines that the method is not done, arrow 196 direct the execution to arrow 182, which in turn leads to execution of operation 184 as discussed above. If operation 194 determines that the operations are done, arrow 198 leads to the end, where any necessary housekeeping type functions such as closing files, releasing allocated system resources, and the like may be performed to end the operations.

If operation 186 determines that additional expansion content should be played, arrow 200 directs execution to operation 202. Operation 202 designates playing expansion content having the temporal flow without appreciable delay. In certain preferred embodiments of the invention, this entails a recursive execution of the operations starting at 180. Arrow 204 directs execution to arrow 188, which directs execution to operation 190, which plays continuing content having the temporal flow without appreciable delay. In certain preferred embodiments of the invention, this entails a recursive execution of the operations starting at 180.

Figure 7A:
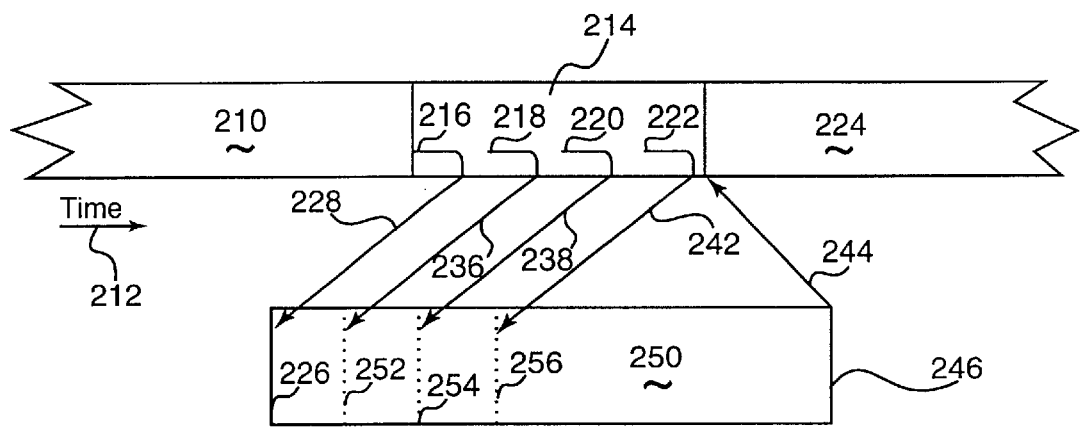
FIG. 7A architecturally depicts part of a user interface for a continuous play media segment expansion in accordance with an embodiment of the invention.

FIG. 7A architecturally depicts part of a user interface for a continuous play media segment expansion in accordance with an embodiment of the invention. The direction of temporal flow is indicated by arrow 212. A preceding segment 210 and a succeeding segment 224 are shown by way of example. The discussion will focus on seamless expansion within segment 214. Note that by way of example, the segment 214 is shown as a single contiguous segment within which expansion decision points 216, 218, 220 and 222 occur. In certain preferred embodiments of the invention, each of these decision points is at the ending terminus of the segment it is in and the beginning terminus of the continuing segment. In certain alternative preferred embodiments, a single segment 214 can possess multiple expansion decision points 216, 218, 220 and 222 successively located before or at the second terminus of the segment 214.

Note further that FIG. 7A shows expansion links 228, 236, 238 and 242 respectively pointing to termini 226, 252, 254 and 256, which all share a common segment 250 and possess a common second terminus 246.

In certain preffered embodiments of the invention, terminus 252 acts as the second terminus of a segment with first terminus 226, as well as terminus 252 acting as the first terminus for a segment with second terminus 254. Terminus 254 can further act as the first terminus of a segment with second terminus 256. Terminus 256 can act as the first terminus of a segment with second terminus 246. In certain alternative embodiments of the invention there are multiple expansion points 226, 252, 254 and 256 successively arranged between the first terminus 226 and second terminus 246 of the segment.

In certain situations, there may be many expansion links within a relatively short frame sequence. Such situations may be implemented as an additional kind of expansion link, possessing multiple decision points where expansion to other segments may be performed. These decisions may be as frequent as once per frame in certain embodiments. The referenced expansion segments may vary for each expansion decision point in certain further preferred embodiments. The first and/or second terminus of these referenced expansion segments may vary linearly with the frame and/or temporal distance from the starting expansion decision point in certain further preferred embodiments. In certain preferred embodiments, one or both of the termini may grow earlier or later temporally with regards to the continuous play content.

Figure 7B:
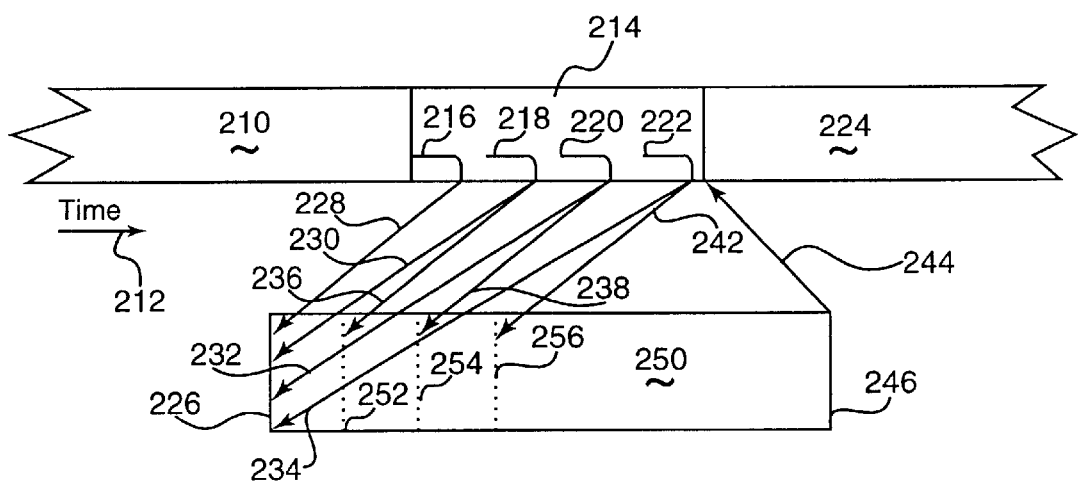
FIG. 7B architecturally depicts part of a user interface for a different continuous play media segment expansion in accordance with an embodiment of the invention.

FIG. 7B architecturally depicts part of a user interface for a different continuous play media segment expansion in accordance with an embodiment of the invention. The direction of temporal flow is indicated by arrow 212. A preceding segment 210 and a succeeding segment 224 are shown by way of example. The discussion will focus on seamless expansion within segment 214. Note that by way of example, the segment 214 is shown as a single contiguous segment within which expansion decision points 216, 218, 220 and 222 occur. In certain preferred embodiments of the invention, each of these decision points is at the ending terminus of the segment it is in and the beginning terminus of the continuing segment. In certain other preferred embodiments, a single segment 214 can alternatively possess multiple expansion decision points 216, 218, 220 and 222 successively located before or at the second terminus of the segment 214.

Note further that FIG. 7B shows expansion links 228, 230, 236, 238 and 242 respectively pointing to termini 226, 252, 254 and 256, which all share a common segment 250 and possess a common second terminus 246. Note that expansion decision point 218 possesses two expansion links 230 and 236, expansion point 220 possesses two expansion links 232 and 238 and expansion point 222 possesses two expansion links 234 and 242.

In certain preferred embodiments of the invention, terminus 252 acts as the second terminus of a segment with first terminus 226, as well as terminus 252 acting as the first terminus for a segment with second terminus 254. Terminus 254 can further act as the first terminus of a segment with second terminus 256. Terminus 256 can act as the first terminus of a segment with second terminus 246. In certain alternative embodiments of the invention there are multiple expansion points 226, 252, 254 and 256 successively arranged between the first terminus 226 and second terminus 246 of the segment.

Figure 8A:
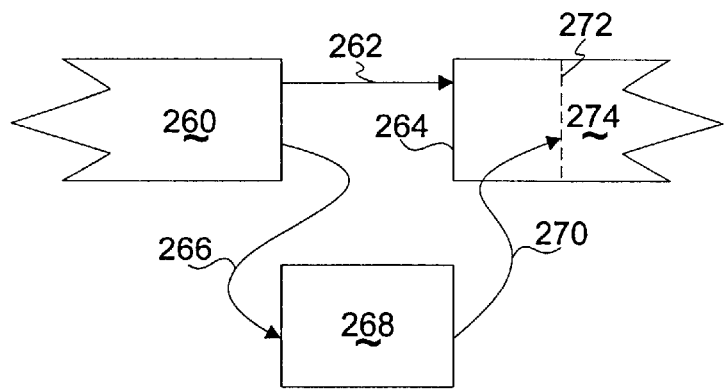
FIG. 8A depicts segment expansion utilizing a landing sub-segment in accordance with an embodiment of the invention.

FIG. 8A depicts segment expansion utilizing a landing sub-segment in accordance with an embodiment of the invention. Segment 260 possesses expansion link 266 to the first terminus of segment 268. The continuity link from segment 262 goes to the first terminus 264 of segment 274. The continuation link after segment 268 goes not to segment 274's first terminus 264, but to landing offset 272 temporally located after first terminus 264. Several methods in accordance with various preferred embodiments of the invention supporting such situations will be discussed later in this document.

Figure 8B:
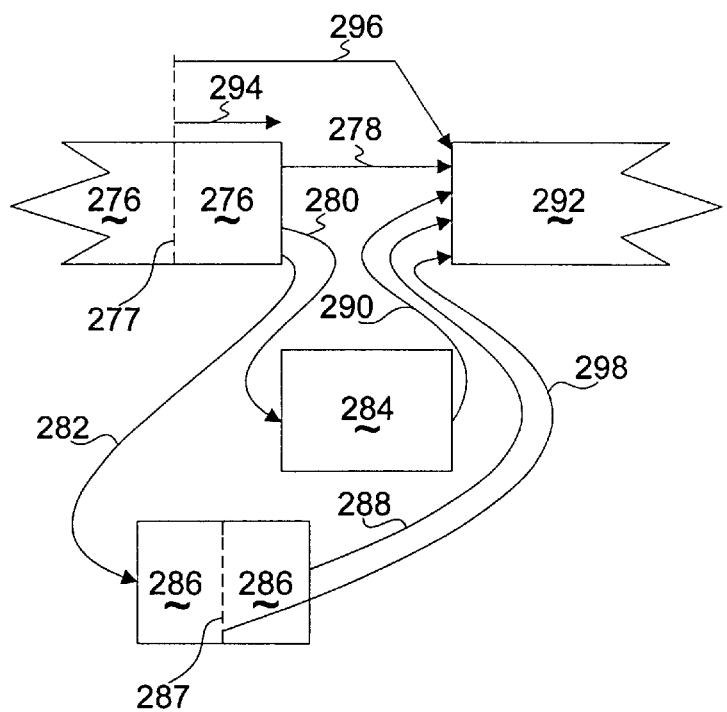
FIG. 8B depicts multiple expansion segments in accordance with an embodiment of the invention.

FIG. 8B depicts multiple expansion segments in accordance with an embodiment of the invention. Segment 276 at its second terminus possesses continuity link 278 and expansion links 280 and 282. Expansion link 280 directs various embodiment of the invention to play segment 284. Expansion link 282 directs various embodiment of the invention to play segment 286. Premature contraction point 277 is temporally located after the first terminus of segment 276 and before the second terminus of segment 276. Premature contraction point 277 has two links 294 and 296. The user can select link 294, which acts to skip the content between contraction point 277 and the second terminus of segment 276, thus triggering the determination of whether to expand segment 284 or expand segment 286 or continue to segment 292. The user can select link 296, which acts to skip the content between contraction point 277 and the second terminus of 276 and continue playing segment 292.

The user choices in certain preferred embodiments may be automated to be performed under the user's direction, which may be further given at a substantially earlier time. An alternative preferred embodiment of the invention automates the expansion selection mechanism at the behest of the editor or producer of the content. A further preferred embodiment of the invention automates the expansion mechanism based upon system knowledge of the user. By way example, expansion content for a seven year girl may be substantially different than expansion content for a forty five year old architect.

The second terminus of segment 284 directs playing to continue at the first terminus of segment 292. Note that continuing to play at segment 292 can be caused by either an explicit reference to segment 292 or by use of a link stack and a continuity link for segment 284 indicating a non-segment as discussed with FIGS. 10 to 12.

The second terminus of segment 286 directs playing to continue at the first terminus of segment 292 via link 288. Premature contraction point 287 is temporally located after the first terminus of segment 286 and before the second terminus of segment 286. Premature contraction point 287 has one link 298. The user can select link 298, which acts to skip the content between contraction point 287 and the second terminus of segment 286, and continue playing segment 292. Note that continuing to play at segment 292 can be caused by either an explicit reference to segment 292 or by use of a link stack and a continuity link for segment 286 indicating a non-segment as discussed with FIGS. 10 to 12.

Figure 8C:
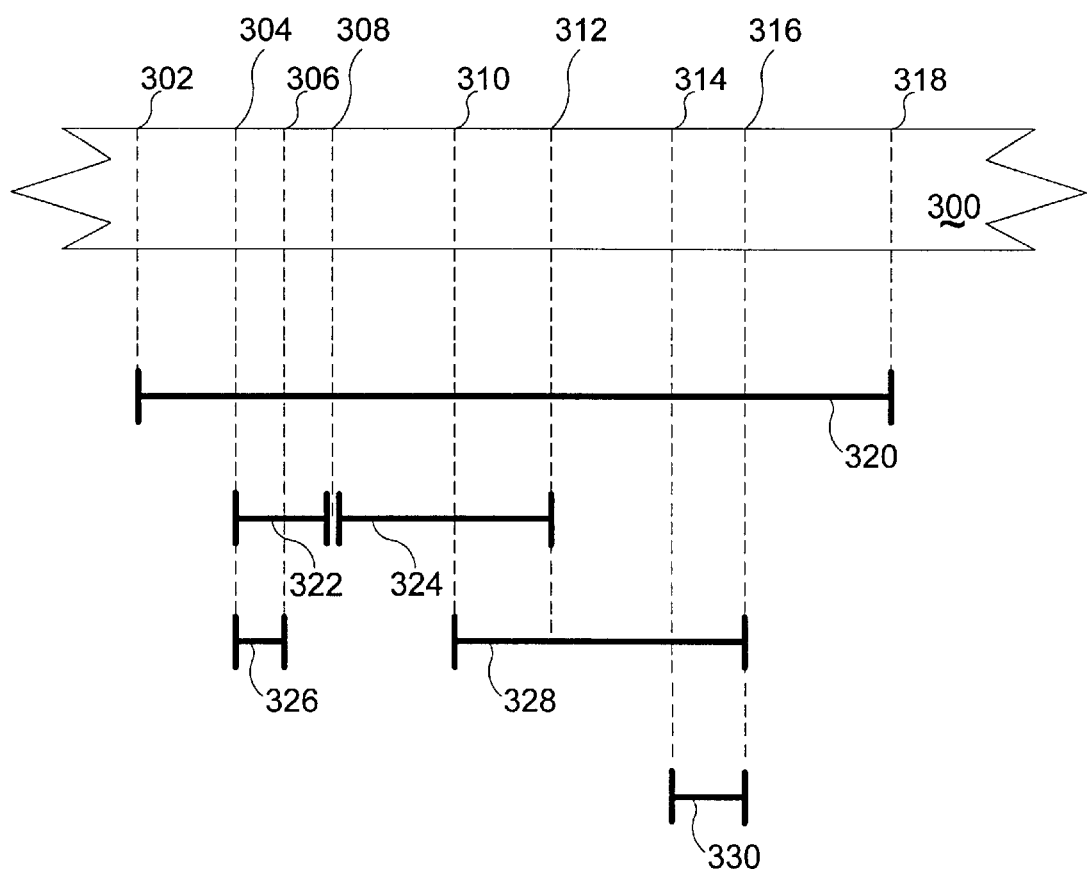
FIG. 8C depicts an annotation chart showing for use designing a continuous play expansion segment system in accordance with certain embodiments of the invention.

FIG. 8C depicts an annotation chart shown for use in designing a continuous play expansion segment system in accordance with an embodiment of the invention. One of the first stages in making an expansion segment content is the acquisition of continuous media stream components. As was previously discussed, MPEG streams can be addressed down to specific frames in a temporal sequence. It is to be noted that raw video streams may be digitally captured and are also addressable down to individual frames. This FIG. depicts the stage in the creation process when the designer has captured frame sequences 300, 320, 322, 324, 326, 328 and 330. The figure represents one conceptual model of an annotation system where the scope, content and duration of the frame sequences can be viewed in preparation for creating the links associated with the completed expansion media product. Note that the specific frame sequences 300, 320, 322, 324, 326, 328 and 330 may be modified over time by the edit process of which this chart is but one component.

In certain preferred embodiments of the invention, this chart uses a notation in which number of timing relation relationships can be derived. Two frame sequences may be temporally abutting, such as sequence 322 and sequence 324, where the second terminus of frame sequence 322 and the first terminus of sequence 324 are essentially temporally adjacent to each other. Frame sequences 326 and 328 display a temporal gap, where the second terminus of frame sequence 326 occurs a perceptible time before the first terminus of frame sequence 328 occurs.

Frame sequence 320 is nested within frame sequence 300, where the first terminus of frame sequence 300 occurs at the same time or before the first terminus of 320, and the second terminus of frame sequence 320 occurs at the same time or before the second terminus of frame sequence 300. Frame sequences 322 and 326 share simultaneous starting times, where each frame sequence's first terminus occurs at essentially the same time. Frame sequences 328 and 330 share simultaneous ending times, where each frame sequence's second terminus occurs at essentially the same time.

Frame sequences 324 and 328 overlap, where the first terminus of the first frame sequence 324 occurs before the first terminus of the second frame sequence 328 and the second terminus of the second frame sequence 328 occurs after the second terminus of the first frame sequence 324.

Frame sequence 320 spans frames sequences 322 and 324, in that the first terminus of frame sequence 320 occurs before the second terminus of frame sequence 322 and the second terminus of frame sequence 320 occurs after the first terminus of frame sequence 324. Another example of spanning frame sequences 322 and 324 could also include a segment starting at 306 and ending at 310 in certain preferred embodiments of the invention. Such a segment would have a first terminus 306 occurring before the second terminus of frame sequence 322 and the second terminus of frame sequence, 310 occurs after the first terminus of frame sequence 324.

In certain preferred embodiments of the invention, the end product of the segmentation design process is presentation upon a broadcast media, where bandwidth and local user content storage constraints may necessitate organizing priorities for transmission and storage of the edited content. To this end and by way of example, consider the following additional structural elements where the frame sequences are organized into horizontal rows for certain further preferred embodiments of the invention.

Frame sequence 300 is the top level of the presentation. This is the basic material, which the designer wishes the users/observers to traverse. In a documentary setting, this is the basic information. In a fictional setting, such as a soap opera, drama or comedy, this is the basic episodic presentation. In an advertising setting, this is the basic pitch material, often limited to 20 to 30 seconds in duration, which is currently transmitted repetitiously many times with no additional content. In sports settings, this is the athletic event with commercials and intermission events, which possess no ability for the users/observers to focus the presentation upon their specific interests. This is the entirety of what can be presented today.

The second horizontal layer contains a single frame sequence 320. Note that at this stage in the editing process, no segment linkages have been determined, so that while the material of 320 is continuous, it may be subsequently partitioned into more than one segment. In other circumstances, frame sequence 320 may be provided with premature contraction points. Segmentation and premature contraction points can be advantageously placed in an advertising setting within say the sporting event presentation to allow the users to return to the sporting event when the action on the field resumes, by way of example. Note that in certain preferred embodiments, the second row may represent the preceding episode of a fictional, historical or documentary series. In certain other preferred embodiments, the second row might be the second highest priority information documenting a product or service in an advertisement.

The third horizontal layer contains frame sequences 322 and 324. In certain circumstances, these frame sequences may represent frame sequences from a previous episode which remain relevant, for instance, where the advertisers have stopped supporting a series, the removed frame sequences may be their previous advertisements. In certain other preferred embodiments, the content of the previous episode may have been rendered irrelevant by subsequent events and therefore no longer relevant to be stored. In certain other preferred embodiments of the invention, each layer has lower priority for transmission and/or storage, so that in various embodiments, the content of a layer may either be given a lower bandwidth budget or local user storage budget. Many of the compression technologies in use and under development support what is known as progressive encoding, which permits the allocation of varying amounts of bandwidth and/or storage for specific segments, or in the case, layers of segments.

The fourth horizontal layer contains frame sequences 326 and 328. In certain circumstances, these frame sequences may represent frame sequences from a previous episode which remain relevant, for instance, where the advertisers have stopped supporting a series, the removed frame sequences may be their previous advertisements. In certain other preferred embodiments, the content of the previous episode may have been rendered irrelevant by subsequent events and therefore no longer relevant to be stored.

The fifth horizontal layer includes one frame sequence 330. This may represent an archival frame sequence where the primary characters were introduced in certain preferred embodiments of the invention. This may also an archival frame sequence where the current dominant plot in a soap opera was introduced in certain preferred embodiments of the invention. In certain other preferred embodiments of the invention, this may represent an overview to an advertiser's product line.

In certain alternative preferred embodiments of the invention, continuous play stream 300 is the "raw" continuous play stream, such the footage of interview, athletic event, or soap opera, by way of example. Segments 320, 322, 324, 326, 328 and 330 all reference the same raw footage. Segment 320 is a subsequence of sequence 300, where the person being interviewed may discuss a specific handbag that they own. In sequence 322, the subject is showing their wallet. In sequence 326, the subject discusses how they acquired the wallet. In sequence 324, the subject demonstrates one of the contents of the handbag, such as a concert ticket. In sequence 328, the subject tells a story inspired by one of the contents of the handbag, such as the concert ticket discussed in sequence 324. In sequence 330, subject sings a song from the concert as told in sequence 328. It should be noted that other annotations could be derived by other editors.

The storage of the "raw" content need only be done once. The segment descriptions represent a very amount of data compared to the continuous play streams they reference. One second of MPEG 2 audio-video content is typically between one half to one megabyte. Each segment referencing that content would typically take less than a few hundred bytes in many preferred embodiments of the invention and might well reference many seconds of content. The separation of segment description tables from the storage of continuous play content is thus advantageous in certain preferred embodiment of the invention. The segment description tables may thus be supplied separately from the "raw" continuous play media stream in certain other preferred embodiments.

FIG. 9A depicts components included in a description 340 of a segment in accordance with an embodiment of the invention. A segment description 340 includes but is not limited to a segment identifier 342, first terminus 344, second terminus 346, continuity link 348 and expansion link pointer 350. A segment identifier 342 in certain preferred embodiments is a number, an address within the addressing system, a file name in a file management system such as a disk drive or an offset into a stream recording system. A first terminus 344 represents the start of the displayable content of the segment in certain preferred embodiments of the invention. A second terminus 346 represents the end of the displayable content of the segment in certain preferred embodiments of the invention. A continuity link 348 direct the various methods of playing a successor segment when playing the current segment is completed and no segment expansion is requested. An expansion link pointer 350 points to an expansion link description as discussed hereafter.

FIG. 9B depicts components included in a description of an expansion link 462. In certain preferred embodiments, an expansion link description 462 includes but is not limited to an expansion segment identifier 352 and an expansion link pointer 356. In certain further preferred embodiments, an expansion link description 462 further includes but is not limited to a cue definition 354. In certain further preferred embodiments, an expansion link description 462 further includes but is not limited to a continuity link offset 358. An expansion segment identifier 352 in certain preferred embodiments is a number, an address within the addressing system, a file name in a file management system such as a disk drive or an offset into a stream recording system. Expansion link pointer 356 either points to another expansion link description or else indicates that there is no expansion link description.

A cue definition in certain preferred embodiment of the invention defines how an expansion link is selected. In certain further preferred embodiments of the invention, the cue definition further defines a discernible entity displayed within the segment, which may be selected to indicate selection of the associated expansion link. In certain further preferred embodiments of the invention, the cue definition may further indicate highlighting the discernible entity.

FIG. 9C depicts a collection 420 of segment descriptions, a collection 460 of expansion links and a continuous play content store 470 in accordance with an embodiment of the invention. Each row of the collection 420 represents a segment description. Each row of the collection 460 represents an expansion link description. Continuous play content store 470 in certain preferred embodiments of the invention includes at least three segments of continuous play streams.

Figure 10:
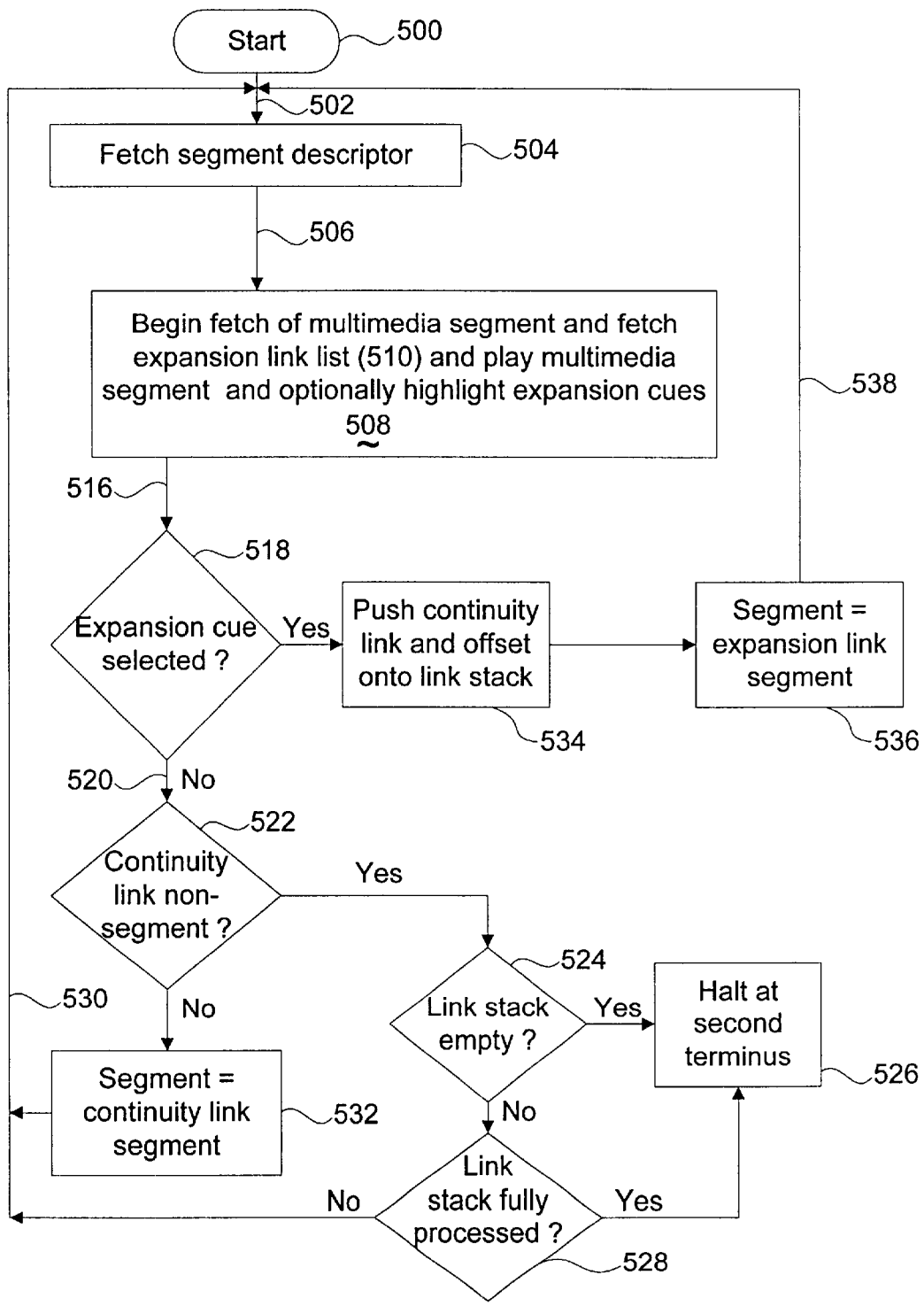
FIG. 10 is a flowchart depicting playing one or more continuous play segments in accordance with an embodiment of the invention.

FIG. 10 is a flowchart depicting playing one or more continuous play segments in accordance with an embodiment of the invention. Start 500 may operate upon the systems resources, causing at least temporary allocation of the system resources needed for the operation of this method. Arrow 502 directs execution to operation 504, which fetches a segment descriptor.

Arrow 506 directs execution to operation 508. Operation 508 performs beginning fetch of multimedia segment, fetching expansion link list (510), playing multimedia segment and optionally highlighting expansion cue. In certain preferred embodiments, beginning fetch of multimedia segment entails initiating an access to a multimedia store. Once such an initiation has begun, the data will be transferred by the access of the multimedia store for an extended length of time. In certain preferred embodiments of the invention, the fetching of the expansion link list occurs concurrently with the beginning of fetching the multimedia segment. In certain preferred embodiments, once the fetching of the multimedia segment has begun, playing the multimedia segment starts. In certain preferred embodiments of the invention optional highlighting of expansion cues starts when the fetch of multimedia segment has begun and the fetching of the expansion link list is completed and the playing of the multimedia segment starts.

Operation 508 further plays a multimedia segment, highlighting optional expansion cues. Note that expansion cues may include but are not limited to a user numerically selecting the player number and team in a team sport in certain preferred embodiments. In certain other preferred embodiments a user may select a discernible entity. In certain further preferred embodiments, the display may highlight one or more of the discernible entity cues.

Arrow 516 directs execution to start operation 518, which determines whether an expansion cue has been selected. Note that arrow 516 must do this before operation 508 has completed playing the current continuous play segment in certain preferred embodiments of the invention. In certain further preferred embodiments of the invention, the arrow 516 schedules operation 518 at least a predetermined time interval before the completion of playing the multimedia segment.

If an expansion cue has not been selected, arrow 520 directs execution to operation 522, which determines whether the continuity link of the segment indicates a non-segment. If the continuity link indicates a segment, the current segment is set to the continuity link segment by operation 532 and execution is directed by arrows 530 and 502 to operation 504, which fetches the segment descriptor and iterating the operations described above. If the continuity link indicates a non-segment execution is directed to operation 524, which determines if the link stack is empty. If the link stack is empty, execution is directed to operation 526, halting the playing of the multimedia segment at the second terminus of the segment. If the link stack is not empty, execution is directed to operation 528 which determines if the link stack has been fully processed. Operation 528 will be described in detail in the discussion of FIG. 12 below. If operation 528 determines that the link stack has been fully processed, execution is directed to halt the playing of the multimedia segment at the second terminus. If operation 528 determines that the link stack has not been fully processed, execution is directed by arrows 530 and 502 to iterate the above described operations starting at operation 504.

Figure 11:
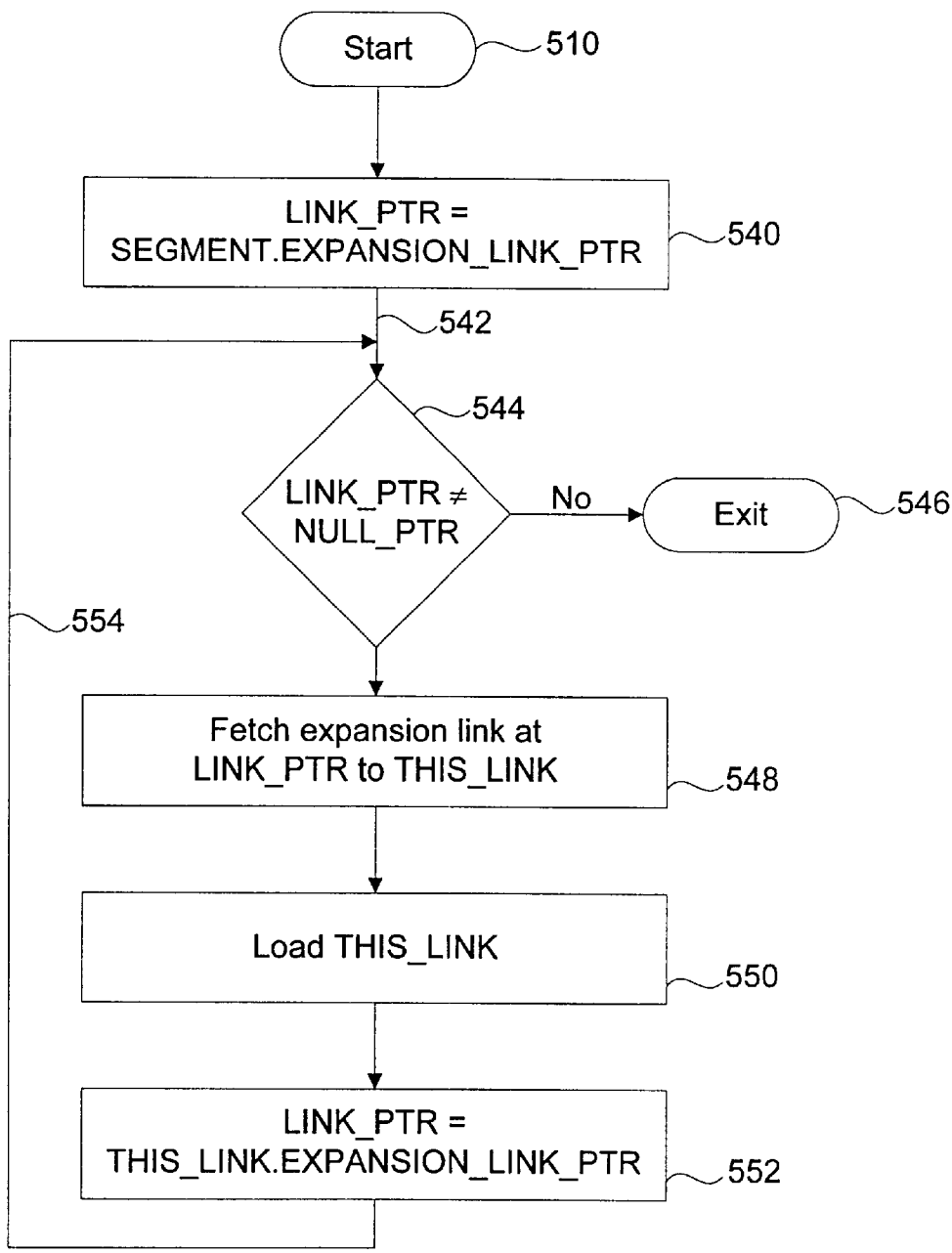
FIG. 11 is a flowchart depicting fetching an expansion link list used as operation 510 in FIG. 10 in accordance with an embodiment of the invention.

FIG. 11 is a flowchart depicting fetching an expansion link list used as operation 510 as part of operation 508 in FIG. 10 in accordance with an embodiment of the invention. Execution begins with the initialization of LINK_PTR= SEGMENT.EXPANSION_LINK_PTR. This is a symbolic notation having a comparable meaning in many computer programming languages, where the current segment description incorporates an expansion link pointer, which is used to initialize a variable which will be used to traverse the expansion link list associated with this segment. Arrow 542 directs execution to operation 544, which determines whether LINK_PTR is not the null link pointer. If LINK_PTR is the null link pointer, execution is directed to exit this flowchart and return to the other tasks to be done in operation 508. Operations 548 fetches the expansion link at LINK_PTR to THIS_LINK, which in certain preferred embodiments of the invention is a memory buffer. The memory buffer THIS_LINK is then loaded into the expansion link table for the segment in certain preferred embodiments of the invention. Operation 552 then sets LINK_PTR to the EXPANSION_LINK_POINTER component of the expansion link description. Arrow 554 then directs execution to arrow 542 to repeat the operations described above starting with operation 544.

Figure 12:
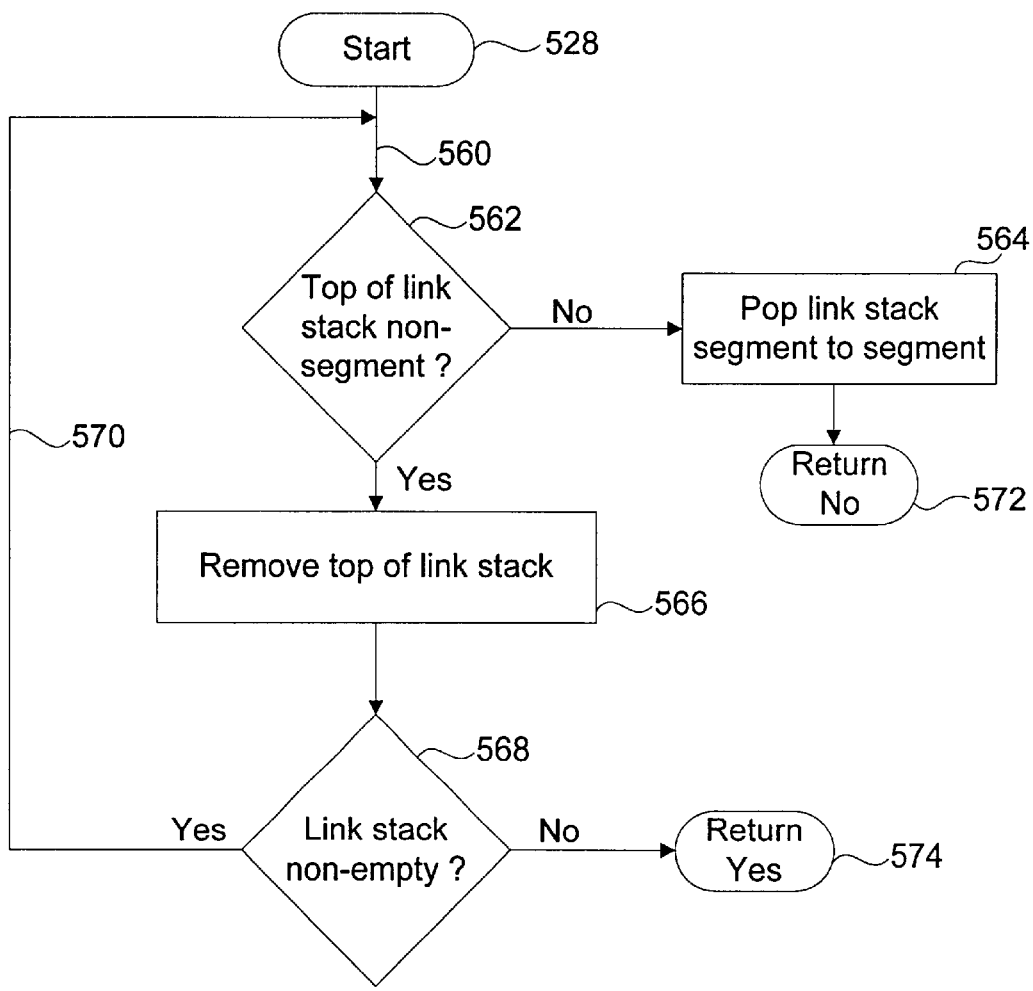
FIG. 12 is a flowchart depicting operation 528 from FIG. 10 which determines whether the link stack has been fully processed in accordance with an embodiment of the invention.

FIG. 12 is a flowchart depicting operation 528, which determines whether the link stack has been fully processed in FIG. 10 in accordance with an embodiment of the invention. Arrow 560 directs execution to operation 562, which determines if the top of the link stack is a non-segment.

If the top of the link stack is a segment, execution is directed to operation 564 which pops the link stack segment into segment, which is the next segment to be played. Execution is then directed to operation 572, which returns a NO.

If the top of the link stack is not a segment, execution is directed to operation 566, which removes the top of the link stack. Execution is then directed to operation 568, which determines if the link stack is non-empty. If the link stack is empty, execution is directed to operation 574, which returns YES. If the link stack is not empty, arrows 570 and 560 direct execution to operation 562 iterating upon the operations described above.

FIG. 13 is a state table of a system in accordance with an embodiment of the invention utilizing flowcharts 10–12 and segment descriptions, expansion links and overall structure of FIGS. 9A, 9B and 9C to perform actions as represented in FIGS. 3A and 3B. Heading 580 presents the column headings. The state of the content player is found in each of the rows beneath the headings. The first column is called the play segment, which is the current segment being played. The second column is the continuity segment of the current play segment. The third column is the expansion link list of the current play segment. The fourth column represents state of the link stack while playing the current segment.

Row 582 depicts the state of the content player while playing segment 100. The play segment is segment 100. The continuity segment of play segment 100 is designated by arrow 114 pointing to segment 104 in FIG. 3B. The expansion link list of the current play segment is designated by arrow 116 to segment 102 in FIG. 3B followed by a null pointer. The link stack is empty while playing the current play segment.

Row 584 depicts the state of the content player while playing the expansion segment 102. The play segment is segment 102. The continuity segment of play segment is designated by arrow 118 pointing to non-segment in FIG. 3B in certain preferred embodiments. The expansion link list of the current play segment designates no segments in FIG. 3B. The link stack contains a link designated by arrow 114 to segment 104 while playing the current play segment.

Row 586 depicts the state of the content player while playing the continuity segment 104. The play segment is segment 104. The continuity segment of play segment is designated by arrow 122 pointing to non-segment in FIG. 3B in certain preferred embodiments. The expansion link list of the current play segment designates no segments in FIG. 3B. The link stack is empty while playing the current play segment.

Figure 14:
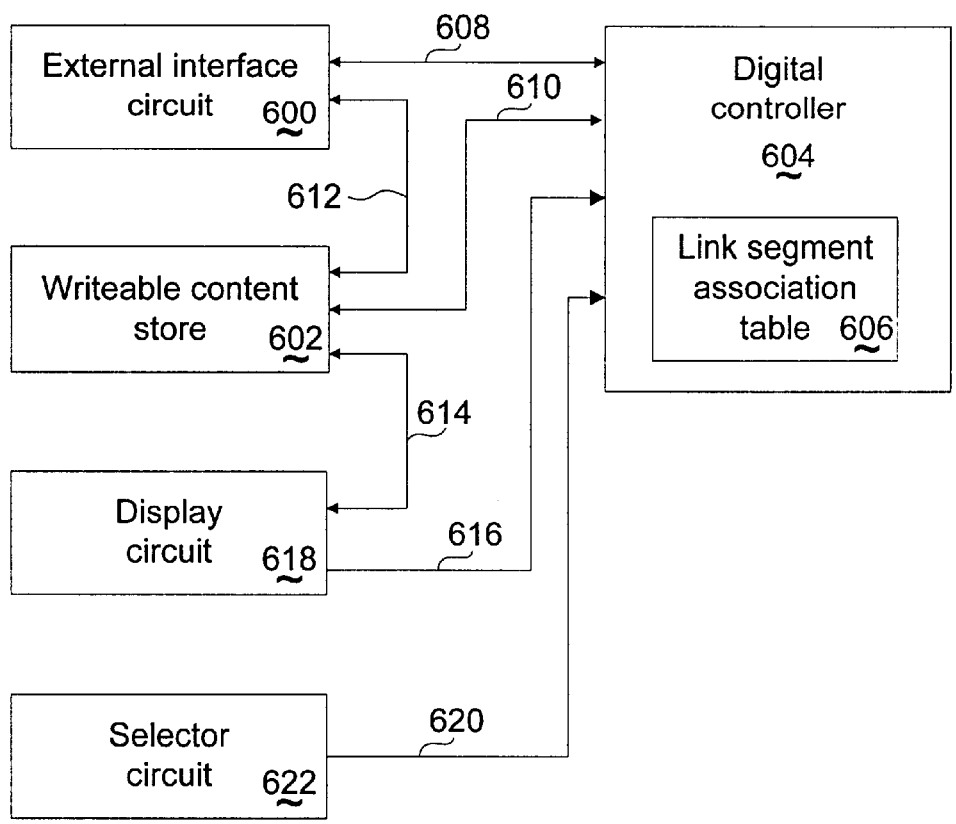
FIG. 14 shows a block diagram of an apparatus in accordance with an embodiment of the invention supporting the capturing and playing of continuous play expansion segments.

FIG. 14 shows a block diagram of an apparatus in accordance with an embodiment of the invention supporting the capturing and playing of continuous play expansion segments. The apparatus includes an external interface circuit 600, writeable content store 602, digital controller 604, display circuit 618 and selector circuit 622.

Digital controller 604 includes a link segment association table 606. The link segment association table in certain embodiments is constructed in a manner compatible with the discussion of FIGS. 9A, 9B and 9C above. Note that in certain preferred embodiments, the link segment association table 606 contains the segment description and link descriptions relevant to the segment currently playing. In certain further preferred embodiments, the link segment association table 606 further contains the segment description and link descriptions relevant to the continuing segment of the current playing segment. In certain other preferred embodiments the link segment association table 606 further contains the segment description and link descriptions relevant to an expansion segment which may be or has been selected during the playing of the current segment. In certain other preferred embodiments the link segment association table 606 may further contain the segment description and link descriptions relevant to the top element of the link stack.

Digital controller 604 embodiments include but are not limited to one or more of the following: general purpose microprocessors, DSPs, parallel processors, embedded controllers and special purpose system controllers. General purpose microprocessors include but are not limited to various word width CISC and RISC. DSPs include but are not limited to various word width computers employing instruction sets allowing at least one add/subtract operation as well as at least one operation comparable to multiplication to be performed in a single instruction cycle. Parallel processor include but are not limited to SIMD, MIMD, and hybrid SIMD/MIMD organizations of either uniform or non-uniform processors.

Digital controller 604 embodiments further include but are not limited to one or more microprocessors or DSPs along with additional circuitry performing specialized data processing. Digital controller 604 embodiments may further include but are not limited to capabilities for MPEG stream partitioning and/or decoding, copy protection processing, decryption, authentication and block data error detection and correction. Digital controller 604 embodiments may further include but are not limited to various implementations as PLAs, CPLDs, FPGAs, ASICs and ASSPs.

Digital controller 604 embodiments may further include local memory resources in the form of RAM and nonvolatile memory and may further include but is not limited to various forms of RAM and one or more caching banks of RAM. Digital controller 604 embodiments of the invention may further include but are not limited to one or more of memory caches physically proximate to and possibly contained within the digital controller 604 embodiments package or packages. Memory caching may include but is not limited to separate caching of memory and data. Memory caching may further include but is not limited to multiple layers of cache structures. Distinct processors within the digital controller 604 embodiments of the invention may further possess distinct caches as well as further localized memory which may in turn include RAM and/or nonvolatile memory. Digital controller 604 embodiments of the invention non-volatile memory may further include but is not limited to boot ROMs and flash memory circuits which may further emulate disk drives with a form of file management system.

The external interface circuit 600 is coupled to digital controller 604 as shown by arrow 608. One external interface circuit 600 embodiment of the invention incorporates a RF tuner including but not limited to demodulators and/or modulators for various broadcast protocols such as FM, FDMA, TDMA, various spread spectrum protocols, Wavelength Division Multiple Access and wavelet division multiple access. Embodiments of external interface circuit 600 RF tuners may employ wireline or wireless physical transport layers. Embodiments of external interface circuit 600, wireline physical transports include but are limited to twisted pair, coaxial cable and various optical fiber mechanisms. Embodiments of external interface circuit 600, wireless physical transports include but are not limited to contemporary broadcast television, HDTV, as well as various radio frequency, microwave and infra red schemes which may well incorporate an antenna, sensor or array of antennas or sensors.

Certain preferred embodiments of external interface circuit 600 include but are not limited to modems. Embodiments of external interface circuit 600, modems include but are not limited to telephone line modems incorporating various transceiver rates which may not be the same for reception as for transmission, as well as various DSL, ADSL, XDSL, ISBN, Ethernet, Token Ring and ATM interfaces. Embodiments of external interface circuit 600, modem physical transport layers include but are not limited to wire line and wireless transport layers. Embodiments of external interface circuit 600, modem wire line physical transport layers include but are not limited to telephone lines, twisted pair wire lines, coaxial cabling and various optical fiber technologies. Embodiments of external interface circuit 600, modem wireless transport layers include but are not limited to directional and non-directional radio, microwave, infrared and optical schemes.

Embodiments of external interface circuit 600 may access external content located at a substantial distance, often embodied within a server supporting a network of user systems via interconnections embodiments of external interface circuit 600. Such networks may further support TCP/IP thereby enabling support for the Internet. Such networks may further support one or more Intranets. Such networks may further support one or more Extranets.

Embodiments of external interface circuit 600 may include but are not limited to video input devices, often possessing external interfaces including video frame capturing circuitry. Embodiments of external interface circuit 600 may further include image processing circuitry further supporting MPEG compatible compression of the captured video stream.

Coupling 608 can be implemented as a set of connections directly between external interface circuit 600 and digital controller 604 in certain preferred embodiments of the invention. This coupling 608 can also be implemented as a shared set of connections with other circuitry in other preferred embodiments of the invention. Further preferred embodiments include effecting these couplings as transactions on the shared set of connections. Further preferred embodiments of the invention include these shared connections forming a bus possessing a bus protocol. Further preferred embodiments of the invention include the bus supporting a digital bus protocol. Other preferred embodiments of the invention include the bus supporting and encoded digital signaling within an essentially analog protocol, including but not limited to protocols such as Firewire (P1394) and other optical fiber communications protocols.

The external interface circuit 600 is also coupled to writeable content store 602 as shown by arrow 612. Coupling 612 may be effected by a dedicated interconnection in certain preferred embodiments of the invention. Coupling 612 may be further effected by a shared interconnection with other couplings, such as coupling 608 in certain further preferred embodiments.

The writeable content store 602 is coupled to digital controller 604 as shown by arrow 610. This coupling 610 in certain preferred embodiment of the invention may be a direct interface to digital controller 604 as a collection of electrical connections to electrical contacts between the package of digital controller 604 and writeable content store 602. In certain other preferred embodiments of the invention, the coupling 610 may be effected by a high speed communications line including but not limited to Fiber Channel or ATM-SONET between digital controller 604 and writeable content store 602.

The writeable content store 602 is coupled to display circuit 618 as shown by arrow 614. This coupling 614 in certain preferred embodiments of the invention may be a direct interface between display circuit 618 and writeable content store 602. In certain other preferred embodiments of the invention, the coupling 614 may be effected by a high speed communications line including but not limited to Fiber Channel or ATM-SONET between display circuit 618 and writeable content store 602.

Display circuit 618 is coupled to digital controller 604 as shown by arrow 616. This coupling 616 in certain preferred embodiments of the invention may be a direct interface between display circuit 618 and writeable content store 602. In certain other preferred embodiments of the invention, the coupling 616 may be effected by a high speed communications line including but not limited to Fiber Channel or ATM-SONET between display circuit 618 and writeable content store 602.

Display circuit 618 embodiments may further include but are not limited to capabilities for MPEG stream partitioning and/or decoding, copy protection processing, decryption, authentication and block data error detection and correction.

Selector circuit 622 is coupled to digital controller 604 by arrow 620. This coupling 616 in certain preferred embodiments of the invention may be a direct interface between display circuit 618 and writeable content store 602. In certain other preferred embodiments of the invention, the coupling may be effected by a communications line protocol including but not limited to RS-232, USB or RS-485 between display circuit 618 and writeable content store 602.

Note that in certain preferred embodiments of the invention, display circuit 618 includes but is not limited to format translation capabilities. In further preferred embodiments of the invention, the format translation capabilities further include and are not limited to MPEG stream decompression capabilities. In other further preferred embodiments of the invention, the format translation capabilities include wavelet algorithmic decompression capabilities. In other further preferred embodiments of the invention, the format translation capabilities include fractal algorithm decompression capabilities. Further preferred embodiments of the invention include but are not limited to 3-D displays as well as multiple perspective displays of higher dimensional continuous content.

Note that further preferred embodiments include but are not limited to audio presentation circuitry. Further preferred embodiments include but are not limited to force feedback tactile interfaces.

Figure 15:
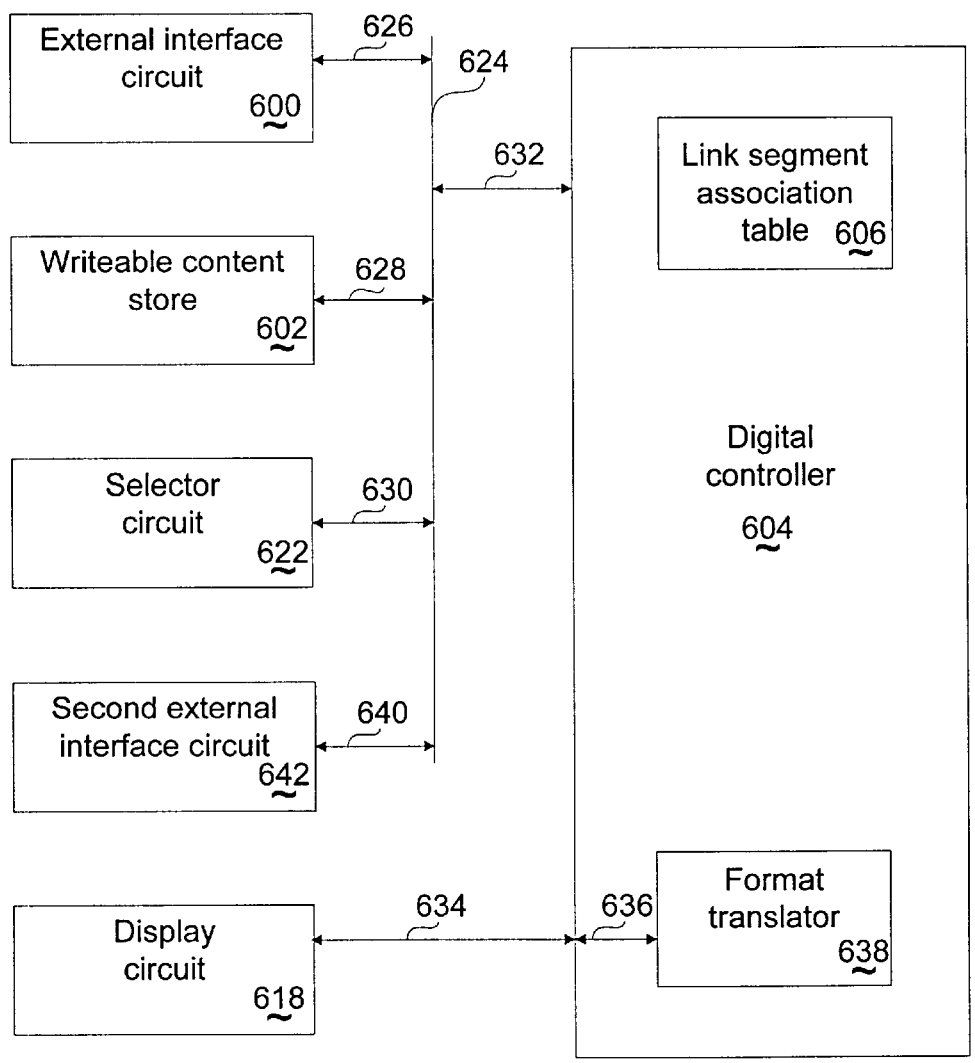
FIG. 15 shows a block diagram of an apparatus in accordance with a second embodiment of the invention supporting the capturing and playing of continuous play expansion segments.

FIG. 15 shows a block diagram of an apparatus in accordance with certain preferred embodiments of the invention supporting the capturing and playing of continuous play expansion segments. The apparatus includes an external interface circuit 600, writeable content store 602, digital controller 604, display circuit 618 and selector circuit 622 as well as a second external interface circuit 642.

The digital controller 604 includes a link segment association table 606 as in FIG. 14. Note that in certain preferred embodiments, the link segment association table 606 contains the segment description and link descriptions relevant to the segment currently playing. In certain further preferred embodiments, the link segment association table 606 further contains the segment description and link descriptions relevant the continuing segment of the current playing segment. In certain other preferred embodiments the link segment association table 606 further contains the segment description and link descriptions relevant to an expansion segment which may be selected during the playing of the current segment. In certain other preferred embodiments the link segment association table 606 may further contain the segment description and link descriptions relevant to the top element of the link stack.

The digital controller 604 further includes a format translator 636. In certain preferred embodiments of the invention, format translator 636 supports translation of one or more MPEG compression formats. In certain preferred embodiments of the invention, format translator 636 supports translation of one or more formats incorporating wavelet compression algorithms. In certain preferred embodiments of the invention, format translator 636 supports translation of one or more formats incorporating fractal compression algorithms.

The coupling of external interface circuit 600, digital controller 604, writeable content store 602, selector circuit 622 and second external interface circuit 642 is effected by a bus 624, with each of these entities being accessible for bus transactions as indicated by arrows 626, 632, 628, 630 and 640 respectively.

In certain preferred embodiments, a compressed MPEG stream may be the standard format protocol by which continuous play content is received, transferred and stored. Such a compressed stream can be readily handled by bus 624 implemented as an inexpensive computer bus such as ISA.

Such a bus 624 implementation can also readily handle the control and feedback transactions between the external interface circuit 600, digital controller 604, writeable content store 602, selector circuit 622 and second external interface circuit 642. An alternative bus 624 implementation includes but is not limited to PCI bus implementations.

Display circuit 618 is coupled to digital controller 604 by a bus 634. Bus 634 is advantageous in certain preferred embodiments to handle the bandwidth of uncompressed frame data to the display circuit, which for an exemplary compression technology such as MPEG can often be greater than a factor of 100 more compressed stream bandwidth. Specific preferred embodiments of bus 634 include but are not limited to PCI bus implementations. Alternative specific preferred embodiments of bus 634 include but are not limited to AGP bus implementations. Further preferred embodiments of the invention include but are not limited to 3-D displays as well as multiple perspective displays of higher dimensional continuous content.

In certain preferred embodiments of the invention, digital controller 604 may be packaged as a single package, or as a single multi-chip module or as a tightly coupled chip set. In certain further preferred embodiments of the invention, bus 634 has an internal bridged version bus 636, which directly interfaces to format translator 638. This is advantageous when line drive and/or transmission line noise issues become dominant, to name one circumstance by way of example. In certain alternative embodiments, bus 634 and bus 636 form a single contiguous bus.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for playing a stored content comprising:
providing a plurality of segments which collectively comprise said stored content, wherein each of said segments has a first terminus and a second terminus; wherein content in each of said segments has a temporal flow from said first terminus to said second terminus, and wherein at least one segment is associated with a plurality of links to a corresponding plurality of other of said segments;
playing said at least one segment with said temporal flow;
determining prior to reaching said second terminus whether a content expansion is desired; and
linking to an expansion segment and playing said expansion segment if said content expansion is desired and to a continuing segment and playing said continuing segment if said content expansion is not desired, where there is an additional link from said expansion segment to said continuing segment such that said continuing segment is played after said expansion segment has been played.

2. A method for playing a stored content as recited in claim 1 wherein at least one of said continuing segments contains a landing sub-segment having a first landing sub-segment terminus and a second landing sub-segment terminus and wherein said linking of said expansion segment to said continuing segment and playing said continuing segment can proceed from a starting point of said landing sub-segment after playing said expansion segment.

3. A method for playing a stored content as recited in claim 2 wherein said first landing sub-segment terminus of said continuing segment substantially coincides with said first terminus of said continuing sub-segment.

4. A method for playing a stored content as recited in claim 2 wherein said starting point of said continuing segment after playing said expanding segment substantially coincides with said first landing sub-segment terminus of said continuing segment.

5. A method for playing a stored content as recited in claim 2 wherein said starting point of said continuing segment after playing said expanding segment substantially coincides with said second landing sub-segment terminus of said continuing segment.

6. A method for playing a stored content as recited in claim 1 wherein at least one of said expansion segments contains a contraction zone significantly preceding said second terminus; further comprising determining within playing said expansion segment containing said contraction zone prior to reaching said contraction zone whether a premature contraction is desired; and wherein playing said continuing segment follows playing said contraction zone if said premature contraction is desired.

7. A method for playing a stored content as recited in claim 1 wherein playing said segments further comprises highlighting an expansion segment cue corresponding to one of said expansion links; and wherein determining prior to reaching said second terminus whether a content expansion is desired further comprises determining whether said expansion segment cue is selected.

8. A method for playing a stored content as recited in claim 7 wherein playing said segments further comprises playing at least one discernible entity and wherein highlighting said expansion segment cue comprises highlighting associated with one of said discernible entities.

9. A method for playing a stored content as recited in claim 8 wherein determining whether said expansion segment cue highlighted by said associated discernible entity is selected further comprises determining whether said associated discernible entity is selected.

10. A method for playing a stored content as recited in claim 8 wherein linking to said expansion segment and playing said expansion segment further comprises playing a transition from said highlighting said associated discernible entity to playing said expansion segment.

11. A method for playing a stored content as recited in claim 1 wherein linking to said segment further comprises requesting said segment, wherein said providing said plurality of said segments further comprises transmitting said requested segment to a segment player and wherein playing said segment further comprises playing said requested and transmitted segment on said segment player.

12. A method for playing a stored content as recited in claim 1 wherein each of said segments is associated with a link corresponding to said continuing segment.

13. A method for playing a stored content as recited in claim 1 wherein linking a segment further comprises reading a link segment association table and wherein providing said associating of one of said segments to one of said links and said corresponding one of said segments further comprises reading said link segment association table.

14. A method for playing a stored content comprising:
providing a plurality of segments which collectively comprise said stored content, wherein each of said segments has a first terminus and a second terminus and a continuity link associated with a member of the collection of a segment indicator and a non-segment indicator; wherein content in each of said segments has a temporal flow from said first terminus to said second terminus; and wherein at least one segment is associated with a plurality of expansion links to a corresponding plurality of other of said segments;

playing said at least one segment with said temporal flow;

determining prior to reaching said second terminus whether a content expansion is desired; and linking to an expansion segment, pushing said continuity link onto a link stack and playing said expansion segment if said content expansion is desired; and linking to a continuing segment and playing said continuing segment if said content expansion is not desired and if said continuity link indicates said continuing segment.

15. A method for playing a stored content as recited in claim 14 further comprising:

determining if said link stack is empty, popping said link stack, playing said segment indicated by popped said link stack
 if said content expansion is not desired, and
 if determining said link stack is not empty and
 if said continuity link indicates a non-segment and
 if said popped link stack indicated a segment.

16. A method for playing a stored content as recited in claim 15 further comprising:

halting said playing upon reaching said second terminus
 if said content expansion is not desired and
 if said link stack is determined to be empty and
 if said continuity link indicates a non-segment.

17. A method for playing a stored content as recited in claim 14 wherein at least one of said expansion segments contains a contraction zone significantly preceding said second terminus; further comprising determining within playing said expansion segment containing said contraction zone prior to reaching said contraction zone whether a premature contraction is desired; and wherein playing said continuing segment follows playing said contraction zone if said premature contraction is desired.

18. A method for playing a stored content as recited in claim 14 wherein playing said segments further comprises highlighting an expansion segment cue corresponding to one of said expansion links; and wherein determining prior to reaching said second terminus whether a content expansion is desired further comprises determining whether said expansion segment cue is selected.

19. A method for playing a stored content as recited in claim 18 wherein playing said segments further comprises playing at least one discernible entity; and wherein highlighting said expansion segment cue comprises highlighting associated with one of said discernible entities.

20. A method for playing a stored content as recited in claim 19 wherein determining whether said expansion segment cue highlighted by said associated discernible entity is selected further comprises determining whether said associated discernible entity is selected.

21. A method for playing a stored content as recited in claim 20 wherein linking to said expansion segment and playing said expansion segment further comprises playing a transition from said highlighting said associated discernible entity to playing said expansion segment.

22. A method for playing a stored content as recited in claim 14 wherein linking to said segment further comprises requesting said segment; wherein said providing said plurality of said segments further comprises transmitting said requested segment to a segment player; and wherein playing said segment further comprises playing said requested and transmitted segment on said segment player.

23. A method for playing a stored content as recited in claim 14 wherein each of said segments is associated with a link corresponding to said continuing segment.

24. A method for playing a stored content as recited in claim 14 wherein linking a segment further comprises reading a link segment association table; and wherein providing said associating of one of said segments to one of said links and said corresponding one of said segments further comprises reading said link segment association table.

25. A method for playing a stored content as recited in claim 14 wherein at least one of said continuing segments contains a landing sub-segment having a first landing sub-segment terminus and a second landing sub-segment terminus and wherein said linking of said expansion segment to said continuing segment and playing said continuing segment can proceed from a starting point of said landing sub-segment after playing said expansion segment.

26. A method for playing a stored content as recited in claim 25 wherein said first landing sub-segment terminus of said continuing segment substantially coincides with said first terminus of said continuing sub-segment.

27. A method for playing a stored content as recited in claim 25 wherein said starting point of said continuing segment after playing said expanding segment substantially coincides with said first landing sub-segment terminus of said continuing segment.

28. A method for playing a stored content as recited in claim 25 wherein said starting point of said continuing segment after playing said expanding segment substantially coincides with said second landing sub-segment terminus of said continuing segment.

29. A storage device for a segmented continuous play media stream comprising: at least three segments, each segment comprising a first terminus and a second terminus wherein said segmented continuous play media stream within each segment progresses from said first terminus to said second terminus; wherein at least one of said segments contains a plurality of links to a corresponding plurality of other of said segments further comprising a continuation link and at least one expansion link and a cue associated with each of said expansion links, stored in said containing segment substantially before said segmented continuous play media stream progresses to said second terminus of said containing segment; wherein said segmented continuous play media stream of said containing segment progresses to said first terminus of said corresponding continuation link segment after progress to said containing segment second terminus; and wherein said segmented continuous play media stream of said containing segment progresses to said first terminus of said corresponding expansion link segment after progress to said containing segment second terminus.

30. A storage device as in claim 29 wherein each of said segments comprising said segmented continuous play media stream contains said continuation link to said corresponding segment.

31. A storage device as in claim 30 wherein said corresponding continuation link segment may designate a null segment terminating said segmented continuous play media stream when said segmented continuous play media stream progresses to said second terminus.

32. A storage mechanism referencing a continuous play media stream segment store comprising a collection of at least three segment descriptors each of said segment descriptors comprising a first terminus referencing a first time point of a continuous play media stream segment contained in said continuous play media stream segment store; a second terminus referencing a second time point of said continuous play media stream segment contained in said continuous play media stream segment store; a continuity link representing one of a collection comprising an indicator of another of segment descriptors and an indicator to a non-segment; and a collection of at least one expansion link elements each of said expansion link elements comprising an expansion segment indicator, an expansion cue indicator and an indicator of one of a collection of an indicator of another of said expansion link elements and an indicator of a non-expansion link element;

wherein each of said segment descriptors further comprises one of said indicators of one of said expansion link element.

33. A storage mechanism referencing a continuous play media stream segment store as in claim 32 wherein said expansion cue indicator further comprises a highlighting descriptor.

34. A storage mechanism referencing a continuous play media stream segment store as in claim 32 wherein each of said expansion link elements further comprises a continuing segment landing offset.

* * * * *

(12) EX PARTE REEXAMINATION CERTIFICATE (9522nd)
United States Patent
Gould et al.

(10) Number: US 6,393,158 C1
(45) Certificate Issued: Feb. 22, 2013

(54) METHOD AND STORAGE DEVICE FOR EXPANDING AND CONTRACTING CONTINUOUS PLAY MEDIA SEAMLESSLY

(75) Inventors: Eric Justin Gould, Austin, TX (US); Rachel M. Strickland, San Francisco, CA (US)

(73) Assignee: Monkey Media, Inc., Austin, TX (US)

Reexamination Request:
No. 90/011,365, Dec. 3, 2010

Reexamination Certificate for:
Patent No.: 6,393,158
Issued: May 21, 2002
Appl. No.: 09/298,336
Filed: Apr. 23, 1999

(51) Int. Cl.
*G06K 9/40* (2006.01)
(52) U.S. Cl. ..... 382/254; 386/248; 386/343; 386/E5.07; 375/E7.004
(58) Field of Classification Search .......... None
See application file for complete search history.

(56) References Cited

To view the complete listing of prior art documents cited during the proceeding for Reexamination Control Number 90/011,365, please refer to the USPTO's public Patent Application Information Retrieval (PAIR) system under the Display References tab.

*Primary Examiner* — Rachna Desai

(57) ABSTRACT

One aspect of the invention is a method for playing a stored content providing a plurality of segments which collectively contains the stored content, each segment has using first terminus and a second terminus with the content having a temporal flow from the first terminus to the second terminus. At least one segment is associated with a plurality of links to other segments. The method includes playing at least one segment with the temporal flow, determining whether a content expansion is desired prior to reaching the second terminus. If the content expansion is desired, then linking to an expansion segment and playing the expansion segment. If the content expansion is not desired, then linking to a continuing segment and playing the continuing segment. The method includes an additional link from the expansion segment to the continuing segment such that the continuing segment is played after the expansion segment has been played. Other aspects of the invention include other methods for playing stored content, for capturing and playing content, capturing segment and linkage descriptions, storage devices of the segment content, storage mechanisms referencing the continuous media content by segments and linkages and apparatus for capturing and playing continuous media content.

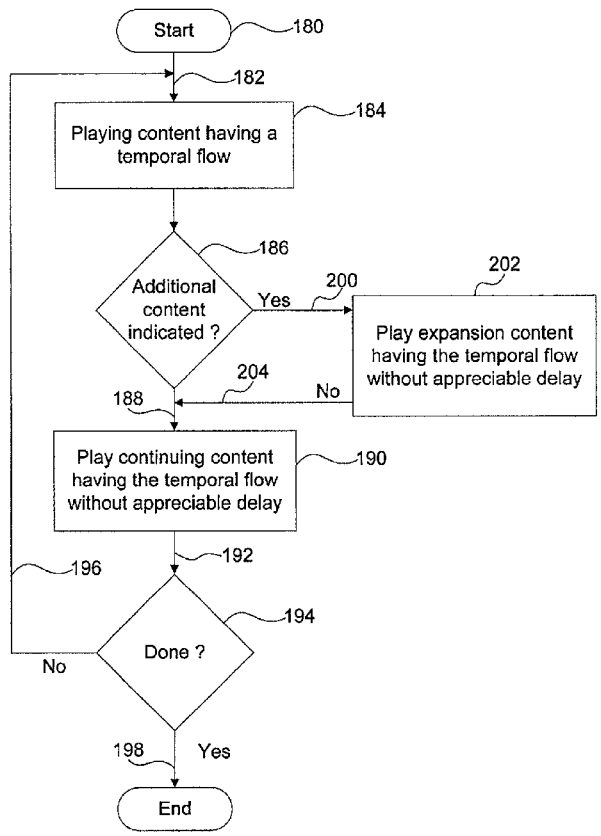

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-34 are cancelled.

New claims 35-41 are added and determined to be patentable.

35. *A method for playing a stored content comprising:*
   *providing a plurality of segments which collectively comprise said stored content, wherein each of said segments has a first terminus and a second terminus; wherein content in each of said segments has a temporal flow from said first terminus to said second terminus, and wherein at least one segment is associated with a plurality of links to a corresponding plurality of other of said segments;*
   *playing said at least one segment with said temporal flow;*
   *determining prior to reaching said second terminus whether a content expansion is desired;*
   *linking to an expansion segment and playing said expansion segment if said content expansion is desired and to a continuing segment and playing said continuing segment if said content expansion is not desired, where there is an additional link from said expansion segment to said continuing segment such that said continuing segment is played after said expansion segment has been played;*
   *wherein playing said segments further comprises highlighting an expansion segment cue corresponding to one of said expansion links; and wherein determining prior to reaching said second terminus whether a content expansion is desired further comprises determining whether said expansion segment cue is selected;*
   *wherein playing said segments further comprises playing at least one discernible entity and wherein highlighting said expansion segment cue comprises highlighting associated with one of said discernible entities;*
   *wherein linking to said expansion segment and playing said expansion segment further comprises playing a transition from said highlighting said associated discernible entity to playing said expansion segment; and*
   *wherein the additional link from said expansion segment to said continuing segment comprises calculating the first terminus of the continuing segment by reference to a continuity link offset after determining whether a content expansion is desired and wherein playing said continuing segment begins at said first terminus of said continuing segment.*

36. *A method for playing a stored content as recited in claim 35 wherein the continuity link offset is greater than zero.*

37. *A method for playing a stored content comprising:*
   *providing a plurality of segments which collectively comprise said stored content, wherein each of said segments has a first terminus and a second terminus; wherein content in each of said segments has a temporal flow from said first terminus to said second terminus, and wherein at least one segment is associated with a plurality of links to a corresponding plurality of other of said segments;*
   *playing said at least one segment with said temporal flow;*
   *determining prior to reaching said second terminus whether a content expansion is desired;*
   *linking to an expansion segment and playing said expansion segment if said content expansion is desired and to a continuing segment and playing said continuing segment if said content expansion is not desired, where there is an additional link from said expansion segment to said continuing segment such that said continuing segment is played after said expansion segment has been played;*
   *wherein playing said segments further comprises highlighting an expansion segment cue corresponding to one of said expansion links; and wherein determining prior to reaching said second terminus whether a content expansion is desired further comprises determining whether said expansion segment cue is selected; and*
   *wherein said expansion segment cue is one of a plurality of expansion cues in an expansion cue container.*

38. *A method for playing a stored content as recited in claim 37 wherein determining whether said expansion segment cue has been selected further comprises determining if the expansion cue container has been selected for visual display.*

39. *A method for playing a stored content as recited in claim 38 wherein determining whether said expansion segment cue has been selected further comprises causing selection of at least one other expansion cue from the plurality of expansion cues if said expansion segment cue has been selected.*

40. *A method for playing a stored content comprising:*
   *providing a plurality of segments which collectively comprise said stored content, wherein each of said segments has a first terminus and a second terminus; wherein content in each of said segments has a temporal flow from said first terminus to said second terminus, and wherein at least one segment is associated with a plurality of links to a corresponding plurality of other of said segments;*
   *playing said at least one segment with said temporal flow;*
   *determining prior to reaching said second terminus whether a content expansion is desired;*
   *linking to an expansion segment and playing said expansion segment if said content expansion is desired and to a continuing segment and playing said continuing segment if said content expansion is not desired, where there is an additional link from said expansion segment to said continuing segment such that said continuing segment is played after said expansion segment has been played;*
   *wherein playing said segments further comprises highlighting an expansion segment cue corresponding to one of said expansion links;*
   *wherein determining prior to reaching said second terminus whether a content expansion is desired further comprises determining whether said expansion segment cue is selected;*
   *wherein the expansion segment cue is visual and changes in appearance if said expansion segment cue has been selected; and*
   *wherein the change in appearance of said expansion segment cue comprises expanding in size.*

41. A method for playing a stored content comprising:
- providing a plurality of segments which collectively comprise said stored content, wherein each of said segments has a first terminus and a second terminus; wherein content in each of said segments has a temporal flow from said first terminus to said second terminus, and wherein at least one segment is associated with a plurality of links to a corresponding plurality of other of said segments;
- playing said at least one segment with said temporal flow;
- determining prior to reaching said second terminus whether a content expansion is desired;
- linking to an expansion segment and playing said expansion segment if said content expansion is desired and to a continuing segment and playing said continuing segment if said content expansion is not desired, where there is an additional link from said expansion segment to said continuing segment such that said continuing segment is played after said expansion segment has been played;
- wherein playing said segments further comprises highlighting an expansion segment cue corresponding to one of said expansion links;
- wherein determining prior to reaching said second terminus whether a content expansion is desired further comprises determining whether said expansion segment cue is selected; and
- wherein determining whether said expansion segment cue is selected comprises determining whether the user has made a motion to select said expansion cue without pushing a button on a selector device.

* * * * *